US009024748B2

(12) United States Patent
Haase et al.

(10) Patent No.: US 9,024,748 B2
(45) Date of Patent: May 5, 2015

(54) PASS-TRACKER: APPARATUS AND METHOD FOR IDENTIFYING AND LOCATING DISTRESSED FIREFIGHTERS

(76) Inventors: Wayne C. Haase, Sterling, MA (US); Zachary S. Haase, Sterling, MA (US)

(*) Notice: Subject to any disclaimer, the term of this patent is extended or adjusted under 35 U.S.C. 154(b) by 0 days.

(21) Appl. No.: 13/427,995

(22) Filed: Mar. 23, 2012

(65) Prior Publication Data

US 2014/0070942 A1 Mar. 13, 2014

Related U.S. Application Data

(60) Provisional application No. 61/465,700, filed on Mar. 23, 2011.

(51) Int. Cl.
*H04Q 1/30* (2006.01)
*G08B 21/02* (2006.01)

(52) U.S. Cl.
CPC .................................... *G08B 21/02* (2013.01)

(58) Field of Classification Search
CPC .......... G08B 3/00; G08B 17/00; G08B 25/00; G08B 19/00; G08B 29/10; G01S 5/0242; G01S 1/76; H04R 27/00
USPC ........... 340/532, 539.11, 539.1, 573.1, 384.4, 340/286.05, 628; 381/71.1, 150
See application file for complete search history.

(56) References Cited

U.S. PATENT DOCUMENTS

| | | | | |
|---|---|---|---|---|
| 6,504,794 | B2 | 1/2003 | Haase | |
| 6,686,839 | B2 * | 2/2004 | Chou et al. | 340/540 |
| 6,826,117 | B2 * | 11/2004 | Haase et al. | 367/119 |
| 6,978,159 | B2 * | 12/2005 | Feng et al. | 455/570 |
| 7,377,835 | B2 * | 5/2008 | Parkulo et al. | 455/521 |
| 7,639,147 | B2 * | 12/2009 | Berezowski et al. | 340/573.1 |
| 2004/0135693 | A1 * | 7/2004 | Schubert et al. | 340/573.1 |
| 2009/0315687 | A1 * | 12/2009 | Kanevsky et al. | 340/384.4 |

* cited by examiner

*Primary Examiner* — Phung Nguyen
(74) *Attorney, Agent, or Firm* — Bay State IP, LLC

(57) ABSTRACT

According to one aspect of the invention, the PASS-Tracker is a hand-held device that improves the ability of a rescuer to quickly locate a distressed firefighter by two processes: (1) detecting and recognizing the acoustic alarm sound from a PASS device in Alarm Mode, and (2) providing an indication to rescue personnel of the shortest path to the victim. The invention does not require a pre-installed infrastructure in a particular building; rather the device can be used in an ad hoc fashion at any fire scene. The PASS-Tracker utilizes a plurality of small microphones to detect the acoustic signal from the PASS device. Internal electronics in the PASS-Tracker measure the time-of-arrival (TOA) of the leading edge of the acoustic wave at each microphone and calculate and display the angle-of-arrival (AOA) of the wave.

18 Claims, 34 Drawing Sheets

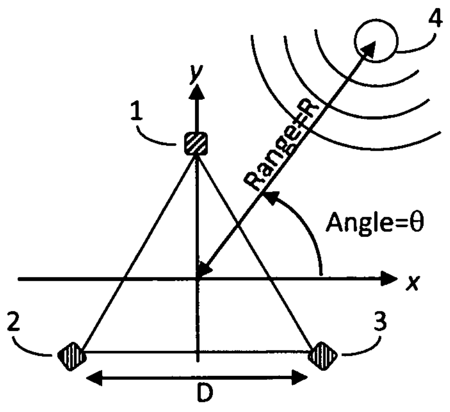
Figure 1
| D [in] | TOA max [μs] |
|---|---|
| 1 | 43 |
| 2 | 87 |
| 3 | 129 |
| 4 | 173 |
| 5 | 216 |
| 6 | 259 |
Figure 1A
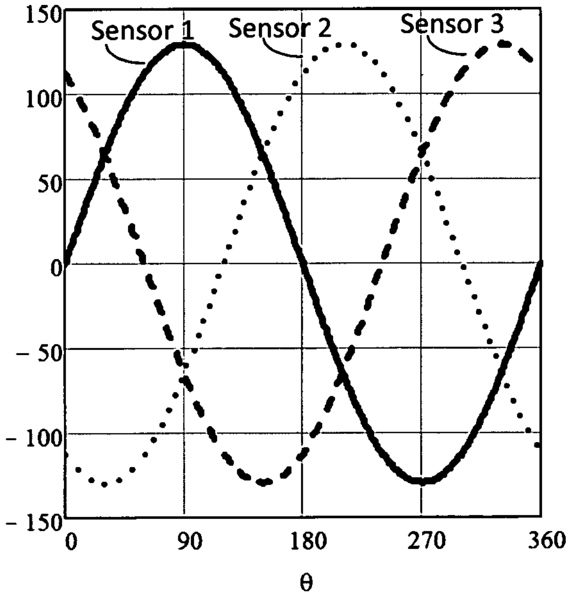
Figure 2

| Device | Center Freq | Bandwidth | Q |
|---|---|---|---|
| Mfg-1 | 2.3 KHz | 1.0 KHz | 2.3 |
| Mfg-2 | 3.0 KHz | 1.8 KHz | 1.7 |
| Mfg-3 | 2.1 KHz | 0.8 KHz | 2.6 |
| Mfg-4 | 3.1 KHz | 0.6 KHz | 5.2 |
| Mfg-5 | 2.9 KHz | 1.0 KHz | 2.9 |

Figure 11F

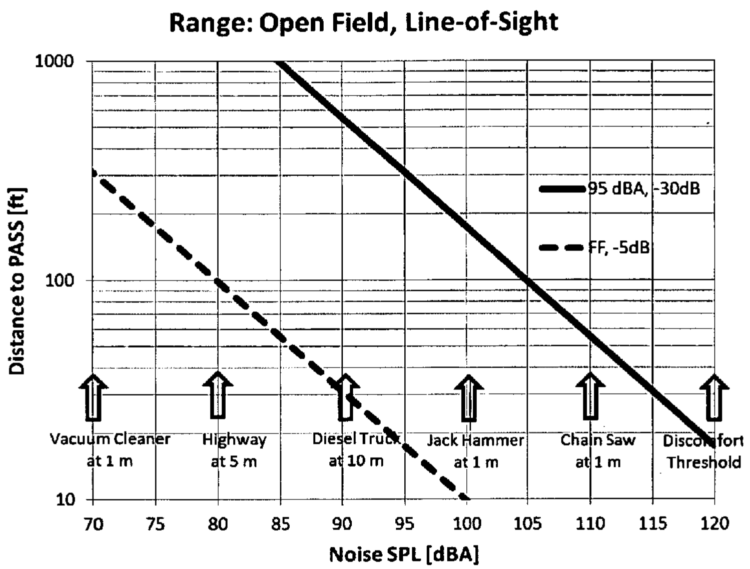

Figure 18

| | |
|---|---|
| 120 dBA | Whistle at 1 m distance, test run of a jet at 15 m distance; Threshold of pain, above this fast-acting hearing damage in short action is possible |
| 115 dBA | Take-off sound of planes at 10 m distance |
| 110 dBA | Siren at 10 m distance, frequent sound level in discotheques and close to loudspeakers at rock concerts |
| 105 dBA | Chain saw at 1 m distance, banging car door at 1 m distance (maximum level), race car at 40 m distance, possible level with music head phones |
| 100 dBA | Frequent level with music via head phones, jack hammer at 10 m distance |
| 95 dBA | Loud crying, hand circular saw at 1 m distance |
| 90 dBA | Disc grinder outside at 1 m distance |
| 85 dBA | 2-stroke chain-saw at 10 m distance; Over a duration of 40 hours a week hearing damage is possible |
| 80 dBA | Very loud traffic noise of passing trucks at 7.5 m distance, high traffic on an expressway at 25 m distance |
| 75 dBA | Passing car at 7.5 m distance, un-silenced wood shredder at 10 m distance |
| 70 dBA | Level close to a main road by day, quiet hair dryer at 1 m distance to ear |
| 65 dBA | Bad risk of heart circulation disease at constant impact is possible |
| 60 dBA | Noisy lawn mower at 10 m distance |

Figure 18A

| Solution | 1 | 2 | 3 | 4 |
|---|---|---|---|---|
| TDOA-2 | 20.1° | 20.1° | 99.9° | 99.9° |
| TDOA-3 | 35.7° | 204.3° | 35.7° | 204.3° |
| $\theta_{Est}$ | 27.9° | 112.2° | 67.8° | 152.1° |
| RMS error | 16.8 µs | 95.9 µs | 59.4 µs | 116.4 µs |
| Error | 2.1° | 82.2° | 37.8° | 86.4° |

Table 4

| Solution | 1 | 2 | 3 | 4 |
|---|---|---|---|---|
| TDOA-2 | 20.1° | 20.1° | 99.9° | 99.9° |
| TDOA-3 | 35.7° | 204.3° | 35.7° | 204.3° |
| $\theta_{Est}$ | 27.9° | 112.2° | 67.8° | 152.1° |
| RMS error | 16.8 µs | 95.9 µs | 59.4 µs | 116.4 µs |
| Error | 2.1° | 82.2° | 37.8° | 86.4° |

Figure 26A

PASS-TRACKER: APPARATUS AND METHOD FOR IDENTIFYING AND LOCATING DISTRESSED FIREFIGHTERS

CROSS-REFERENCE TO RELATED APPLICATION

This application takes priority from and claims the benefit of U.S. Provisional Patent Application Ser. No. 61/465,700 filed on Mar. 23, 2011, the contents of which are hereby incorporated by reference.

BACKGROUND OF THE INVENTION

1. Field of the Invention

The instant invention relates generally to systems, apparatus, and methods for automatic detection and location of acoustic sources in the presence of high levels of background noise. In particular, the invention relates to a process of detecting and rapidly locating the Personal Alert Safety System ("PASS") carried by firefighters and other first responders when the PASS is in Alarm Mode.

2. Description of the Related Art

Firefighters and other first responders throughout the US and in many parts of the world carry a Personal Alert Safety System (PASS), a device that produces a loud alarm tone if the user is in peril. The alarm tone is intended to perform two primary functions: (1) notify others that the user is in need of immediate assistance, and (2) assist the rescue operation by providing an acoustic signal that can be located by the rescue team. The PASS device automatically switches from Sensing Mode to Alarm Mode if the user is motionless for thirty seconds. Alternatively, the user can manually trigger Alarm Mode by pressing a push-button.

PASS devices are certified to standards generated by the National Fire Protection Association. For the 2007 edition of NFPA 1982 Standard on Personal Alert Safety Systems (PASS), design requirements for the PASS alarm signal include:

1. PASS shall sound the alarm signal when switched to the Alarm Mode.
2. While in the Sensing Mode, PASS shall sound the alarm signal when activated by the motion sensing component when motion is not detected for (30) seconds, +5/−0 seconds.
3. When activated by the motion sensor, the alarm signal shall be preceded by a pre-alarm signal, which shall sound 10 seconds, +3/−0 seconds before the sounding of the alarm signal.
4. During the alarm signal sounding, all other audible PASS signals shall be rendered inactive.
5. The alarm signal shall have a duration of at least 1 hour at a sound pressure level (SPL) of not less than 95 dBA at a distance of 3 m (9.9 ft).
6. The alarm signal, once activated, shall not be deactivated by the motion detector.
7. Any action to silence the alarm signal and the actual silencing of the alarm signal shall not permit the PASS to remain in the Off Mode.
8. The silencing of the alarm signal shall automatically reset the PASS to the Sensing Mode.

The NFPA Electronic Safety Equipment Technical Committee is responsible for the NFPA 1982 document, which is reviewed and updated approximately every five years. PASS devices certified to the 2007 Edition of NFPA 1982 generally have different alarm tones, depending on the particular manufacturer of the PASS device. The 2013 Edition of NFPA 1982 will specify and standardize the alarm tone so that all PASS devices will sound the same.

Detection Environment

In addition to the usual visibility, contamination, moisture, and temperature issues surrounding a fire scene, the detection of an acoustic signal must deal with the presence of multiple echoes from the structure; in wave propagation terminology, this is known as a high multipath environment. The problem is particularly difficult in smaller structures with highly reflecting surfaces, such as stairwells with concrete walls or shower stalls with tile walls.

The Pathfinder System developed by Summit Safety solves the multipath problem by use of a continuous-wave (CW) ultrasonic transmitter (Beacon) and a directional receiver (Tracker), which detects waves propagating only from a narrow angle. The system is more fully disclosed in U.S. Pat. No. 6,504,794, entitled "Tracking, safety and navigation system for firefighters" and which issued Jan. 7, 2003, and U.S. Pat. No. 6,826,117, with the same title and which issued Nov. 30, 2004. The user must manually scan the area with the Tracker to determine the direction of the strongest signal, which implies the direction of the shortest path to the Beacon. In order to achieve a narrow receiving beam angle, a receiving sensor must have a minimum width of 5-10 wavelengths. For the Pathfinder Tracker, this requirement necessitates the use of ultrasound to ensure portability. The same approach could be used to detect a PASS device, but the size of the sensor would be prohibitive. For example, the wavelength at 1 KHz is approximately 1.13 feet and at 4 KHz is approximately 3.4 inches; a five-wavelength requirement would mean the sensor width would be a minimum of 17 inches (at 4 KHz) and maximum of 5.6 feet (at 1 KHz). In addition, since the 2007 edition of NFPA 1982 allows sequential alarm tones, a manual scanning operation would need to be very slow to ensure that the loudest section of the PASS tone was present at all scan angles.

U.S. Pat. No. 7,639,147 B2 by Berezowski et al. entitled "System and Method of Acoustic Detection and Location of Audible Alarm Devices" which issued 29 Dec. 2009 describes a system of audio sensing modules that comprise a pre-installed infrastructure inside a building. Each of the audio sensing modules incorporates a single sensor (microphone) to collect a time-based record for signal processing. The maximum SPL (sound pressure level) and the minimum SPL for the recording form the basis for PASS alarm detection: if the minimum SPL is not less than a predetermined threshold level or if the difference between the maximum and minimum SPL is below a predetermined threshold level, the module is unable to reliably detect a PASS device. If the SPL levels pass these two threshold tests, the module then determines if an alarmed PASS device is present by analyzing the frequency content of the signal; if the frequencies match the frequency characteristics of the expected PASS device, the module then identifies the repetition pattern of the frequencies. Only after passing the two threshold tests, the frequency content test and the frequency repetition test does the module report the detection of an alarmed PASS device. According to the patent, the process of "locating" a PASS device is accomplished by having multiple sensing modules distributed throughout the building; while not stated explicitly, detection by a particular module implies that the PASS device has been "located" (i.e., its location is within detection range of the particular module). Unfortunately the accuracy of the "location" would be crude at best: the distressed firefighter could still be at a considerable distance from the module. Furthermore, any rescuers would need a map of the building with the locations of the pre-installed modules identified. In addition, the modules would require either a wired or a wireless RF telemetry link in order to notify personnel outside the building that an alarmed PASS device had been detected.

Non-acoustic technologies have also been proposed for locating firefighters in distress. For example, radio frequency systems have been developed to locate firefighters. Such systems have limited capabilities inside a building due to difficulties in wave propagation resulting from the metal and dielectric materials used in the building construction.

SUMMARY OF THE INVENTION

The instant invention, as illustrated herein, is clearly not anticipated, rendered obvious or even present in any of the prior art mechanisms, either alone or in any combination thereof.

According to one aspect of the invention, the PASS-Tracker is a hand-held device that improves the ability of a rescuer to quickly locate a distressed firefighter by two processes: (1) detecting and recognizing the acoustic alarm sound from a PASS device in Alarm Mode, and (2) providing an indication to rescue personnel of the shortest path to the victim. The invention does not require a pre-installed infrastructure in a particular building; rather the device can be used in an ad hoc fashion at any fire scene. The PASS-Tracker utilizes a plurality of small microphones to detect the acoustic signal from the PASS device. Internal electronics in the PASS-Tracker measure the time-of-arrival (TOA) of the leading edge of the acoustic wave at each microphone and calculate and display the angle-of-arrival (AOA) of the wave. Additional inertial sensors inside the PASS-Tracker compensate for motion of the device in order to keep the display indicator pointing in the direction of the path to the distressed firefighter. Knowledge of the specific format of the PASS alarm tone—in particular, its swept-frequency nature—allows the PASS-Tracker to use pulse-compression and cross-correlation techniques to detect the alarm sound even in the presence of significant fireground noise.

There has thus been outlined, rather broadly, the more important features of the PASS-Tracker in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways, including applications involving not only firefighters. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

FIG. 1 illustrates a view of a PASS-Tracker having three microphones separated by distance D and located at range R and at angle θ from an acoustic source, such as a PASS device.

FIG. 1A provides time-of-arrival data for various spacing between the microphones of FIG. 1.

FIG. 2 illustrates the time-of-arrival for the three microphone sensors.

FIG. 11F provides estimates of PASS resonances for commercial PASS devices based on the spectra of FIG. 11.

FIG. 18 shows the improved detection of a PASS device using the PASS-Tracker compared to conventional auditory detection in the presence of fireground noise.

FIG. 18A provides typical sound pressure levels for common sounds.

FIG. 26A shows the difference between AOA (Angle of Arrival) estimates using the methods of FIG. 25 and FIG. 26.

DETAILED DESCRIPTION OF THE PREFERRED EMBODIMENTS

Figure 3:
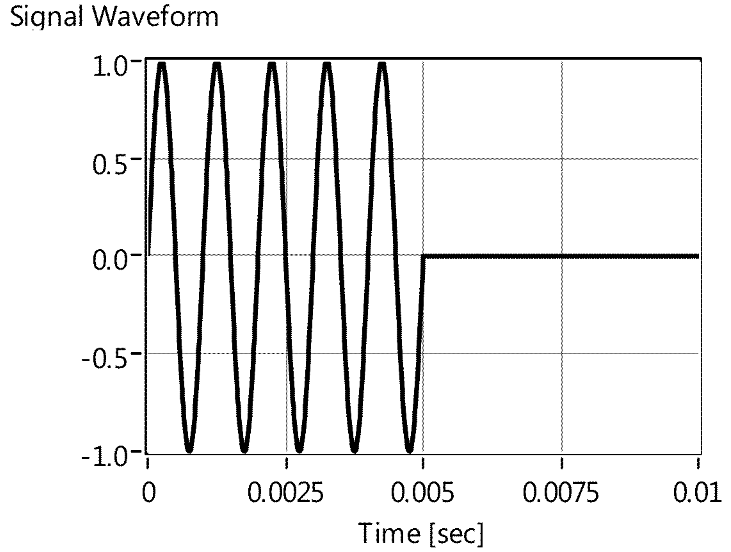
FIG. 3 illustrates a five-cycle tone burst.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

A preferred embodiment of the instant invention would employ three omni-directional sensors as illustrated in FIG. 1. Three sensors would be sufficient to determine e, the angle-of-arrival (AOA) of a wave from a source at a distance R in two dimensions; four sensors (e.g., mounted at the four corners of a tetrahedron) would be required to determine the AOA in three dimensions. The sensors would typically be miniature microphones, such as the ones used in a cell phone or laptop. For example, the Knowles Acoustic SPM0404HD5H, which has virtually flat frequency response from 100 Hz to 10 KHz, is approximately 5×4×1.3 mm.

In order for the system of FIG. 1 to operate in a multipath environment, one of two techniques could be used. The first would be to select the strongest signal and thus rely on the attenuation of the echoes relative to the main wave in order to determine the shortest path to the source; while this method works well for ultrasonic signals (with much higher attenuation), it would work poorly for audible signals (which have relatively low attenuation). The second technique would detect the time of arrival (TOA) of the initial part of the PASS alarm signal for each sensor. The system would then calculate the AOA based on the time-difference-of-arrival (TDOA) of the signal among the three sensors. For example, for e=90°, the source 4 would be in the +y direction and the signal would arrive first at Sensor 1, followed by a simultaneous arrival at both Sensors 2 and 3.

The performance of a TDOA approach in terms of angular resolution depends on the system's ability to accurately detect the arrival time of the wave for each sensor. FIG. 2 shows the time of arrival in microseconds (μs) for a wave to reach each sensor relative to the time the wave reaches the origin of FIG. 1 for a sensor spacing, D, of 3 inches as a function of source 4 angle θ. A positive value indicates the wave arrives earlier at the sensor. For a given angle, the TOA is proportional to the sensor spacing; FIG. 1A shows the maximum values of the TOA curves as a function of sensor spacing D.

FIG. 2 can also be used to estimate the accuracy of the source angle based on the accuracy of the TOA measurement. For example, for a sensor spacing of 3 inches (as in FIG. 2), a change in θ of 180 degrees corresponds to a total change in TOA of 260 μs; an error of 50 μs in TOA for a sensor would produce an angle error of approximately 35°, and an error of 25 μs in TOA for a sensor would produce an angle error of approximately 17°. This suggests that for a three-inch spacing of the sensors, the TOA measurements need to be on the order of about 25 μs for a reasonably accurate estimate of the angle of the source sufficient to direct a rescuer toward a distressed firefighter. If the sensor spacing were increased to 6 inches, the TOA accuracy requirements for the same angle error would be relaxed by a factor of 2; i.e., a 50 μs error in TOA for a sensor would produce an angle error of about 17°.

TOA Detection Based on Start of Received Signal

The measurement accuracy for time of arrival (TOA) for a sensor depends heavily on the specific waveform of the alarm sound generated by the particular PASS device and on the signal-processing method used to measure TOA. For example, if the PASS alarm sound is a constant-frequency tone that is gated on and off as illustrated in FIG. 3, the simplest measurement technique would be to determine the start of the received signal. FIG. 3 shows five cycles of a 1 KHz tone, with each cycle lasting 1 ms; this type of signal is typically called a "constant-frequency tone burst." Accurately detecting the start of the waveform in μs (one fortieth of the cycle) would be difficult. The problem would be exacerbated by the fact that most PASS devices use piezoelectric elements to generate the sound, and these devices are resonant, causing the first few cycles to be at reduced amplitude. In addition, any fireground noise picked up by the sensor could be misinterpreted as a PASS signal.

TOA Detection Based on Single-Tone Cross-Correlation

An improved embodiment uses a process known as cross-correlation to detect the acoustic signal; the signal processor uses a reference "image" of the ideal signal as a matched filter and essentially "slides" the image past the received signal, multiplying the two at all points in time and adding the products to form a single value for the particular shift position. When the image and the signal are lined up, the cross-correlator has a maximum output. If the two signals are identical, the process is known as "autocorrelation"; if the two signals are different, the process is called "cross-correlation." Detection of an alarm signal is done with cross-correlation, because one input to the correlator is the received acoustic signal, and the second input is the ideal reference. The auto-correlation process is useful to illustrate the general performance of a cross-correlator when (a) the received acoustic signal is a perfect match to the reference and (b) no additional noise is present in the received signal.

Figure 4:
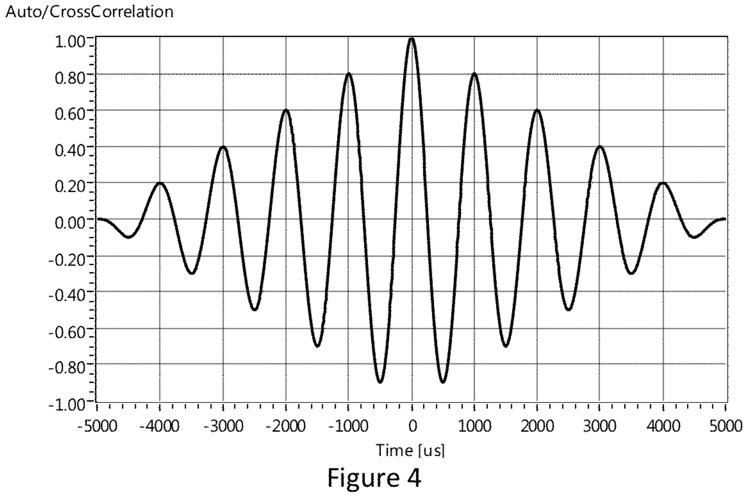
FIG. 4 illustrates the autocorrelation function of the waveform of FIG. 3.

FIG. 4 shows the normalized correlator output for the signal of FIG. 3 (in this case, autocorrelation). The correlation function has a periodic shape with successive "cycles" corresponding to each time the reference image cycles line up with the received signal cycles; the auto-correlation function has a relative amplitude corresponding to how many of the cycles overlap. Note that the center cycle has the same width as a cycle of the original signal. While it may be possible to detect the center peak to a fraction of a cycle (to achieve the desired 25 μs time resolution), a more-difficult problem is posed by the adjacent cycles which are at 80% of the amplitude of the center peak; if either one is picked as the TOA due to additive noise, an error of 1 ms will occur, resulting in an unacceptable error in angle estimate.

Figure 5:
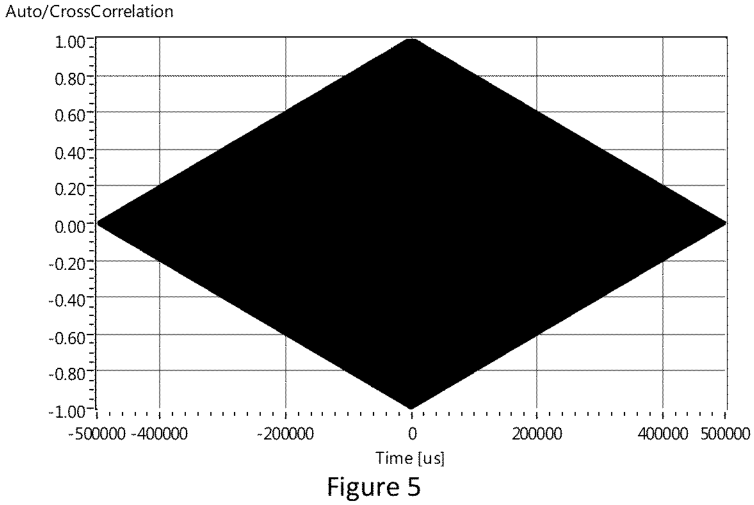
FIG. 5 illustrates the autocorrelation function of a 500-cycle tone burst.

In reality, PASS alarm sounds typically last much longer than the 5 ms illustrated in FIG. 3; tones lasting 1-5 seconds are more common. FIG. 5 shows the output of the same auto-correlator if the burst of FIG. 3 is extended to last 0.5 second. In this case, there are 500 cycles in the tone and 999 cycles in the correlation function. It would be virtually impossible to pick the center peak in the presence of any amount of noise, and consequently it would be extremely difficult to accurately determine the angle of the source if the alarm signal is a constant-frequency tone burst using cross-correlation.

Effect of Multipath

Figure 6:
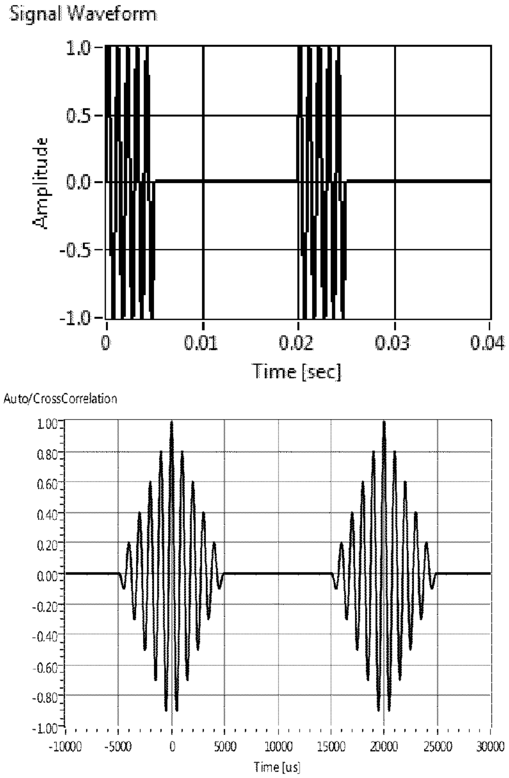
FIG. 6 shows the received waveforms and autocorrelation function of a five-cycle tone burst with an additive echo due to multipath.
Figure 7:
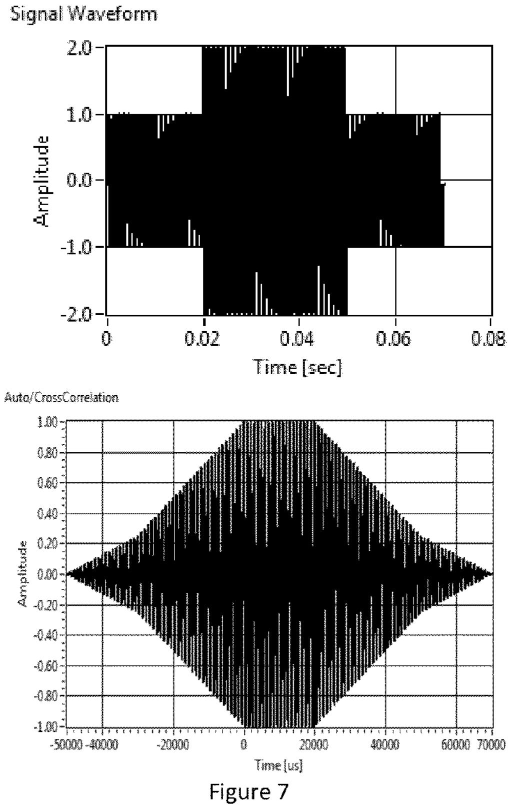
FIG. 7 shows the received waveforms and autocorrelation function with an additive echo and a longer tone burst compared to that of FIG. 6.

As noted above, the typical fireground detection environment has a high level of multipath. FIG. 6 shows a 5-cycle received signal (upper waveform) comprised of an initial burst identical to that of FIG. 3 plus a second echo of the same amplitude and delayed by 20 ms corresponding to a path that is feet longer. The lower waveform of FIG. 6 is the cross-correlation of the received signal with an image that is a single burst (identical to that of FIG. 3). The cross-correlation waveform shows two peaks, separated by the 20 ms delay. In operation, the function of the cross-correlation detector in the presence of multipath would be to accurately determine the TOA of the first pulse, which would indicate the arrival time of the signal that traveled the shortest path from the source to the sensor. With the short burst, although difficult, it might be possible to detect the first peak or the center peak with the cross-correlation detection. FIG. 7 shows the same waveforms if the burst length is increased to 50 ms. In this case, the bursts in the received signal overlap. Trying to identify the first of the two echoes using the cross-correlation function would be virtually impossible; if the burst length were further increased to 0.5 seconds as in FIG. 5, the problem would only be more difficult.

Pulse Compression

The previous discussion has demonstrated that for tone bursts of a single frequency, a cross-correlation detector works only for very short bursts. However, if the burst is modified to allow more than one frequency, the situation changes dramatically. Radar, sonar, and echography system designers have long known of a technique to improve range resolution known as pulse compression. Several variations are based on a "chirp" waveform, including linear frequency modulation (LFM), nonlinear frequency modulation (NLFM), linear period modulation (LPM), and nonlinear period modulation (NLPM). The term "chirp" was coined because the sound of an LFM burst emulates the sound of a bat or bird, demonstrating that Nature has found the technique advantageous. In addition to chirps, phase coding modulation can also be used for pulse compression. For example, all of the satellites of the Global Positioning System (GPS) transmit on the same frequency with pseudorandom phase modulation unique to each satellite; the signals can be separated by receivers using cross-correlation. This type of communication is also known as code division multiple access (CDMA).

Figure 8:
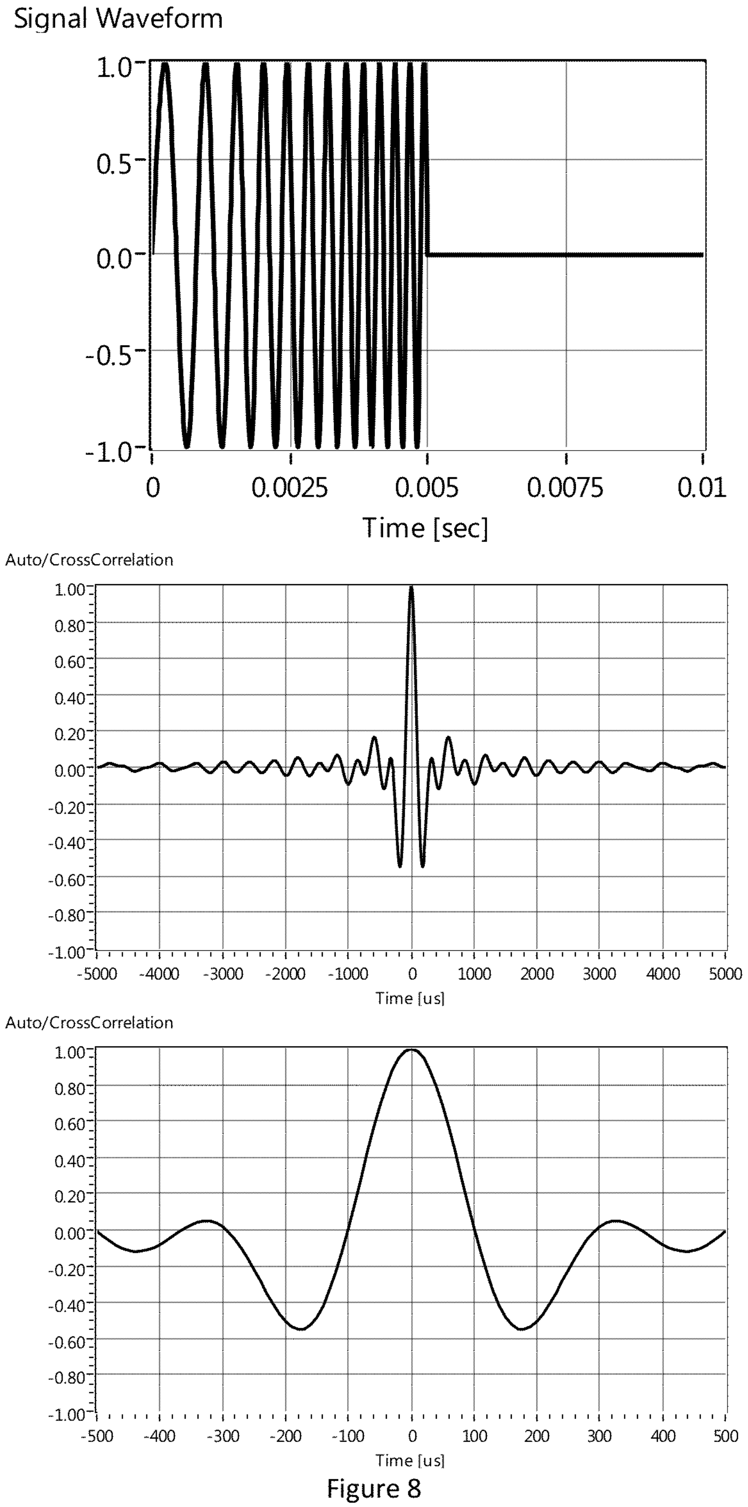
FIG. 8 shows an LFM (Linear Frequency Modulation) chirp from 1 KHz to 4 KHz over 5 ms duration.
Figure 9:
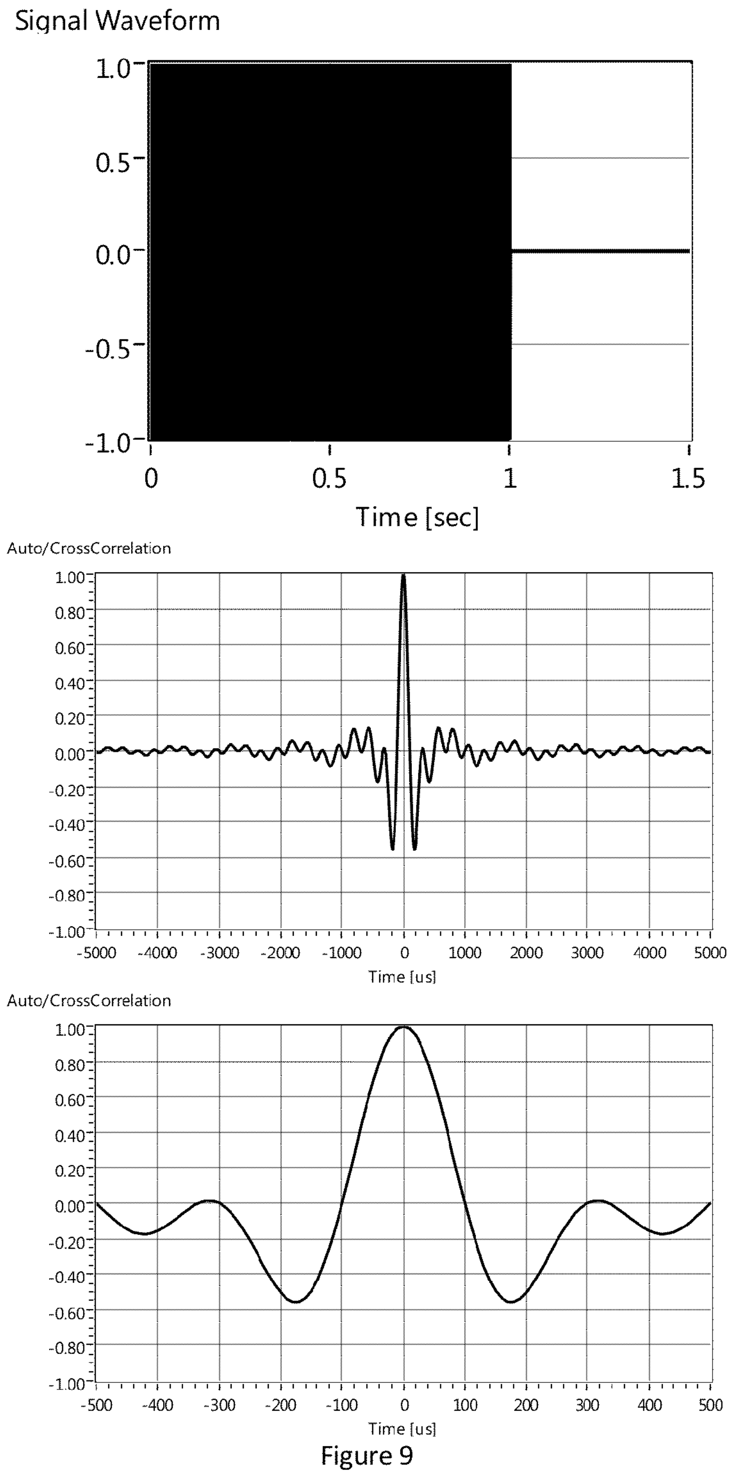
FIG. 9 shows an LFM chirp from 1 KHz to 4 KHz over 1 sec duration.
Figure 10:
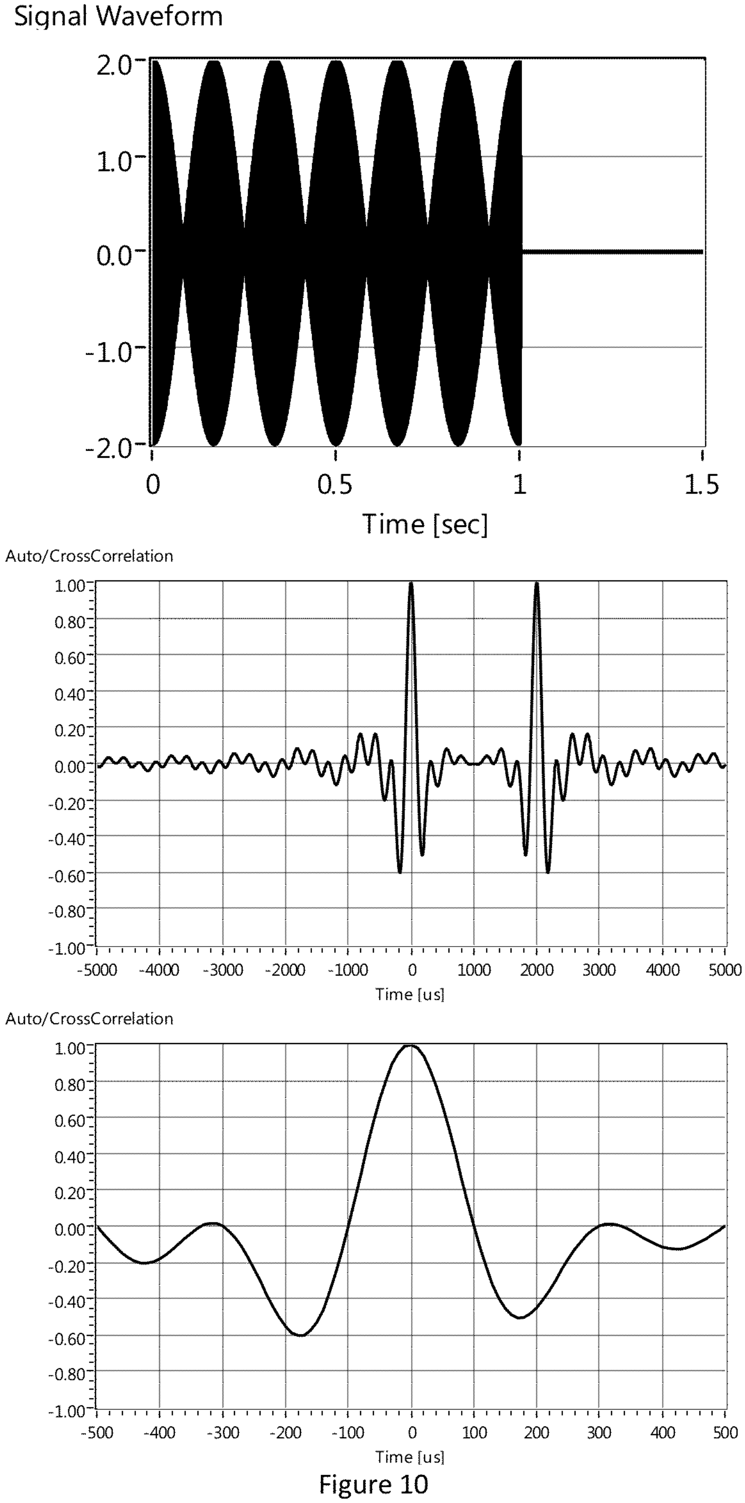
FIG. 10 shows the effect of an additive echo for the system of FIG. 9.
Figure 11A:
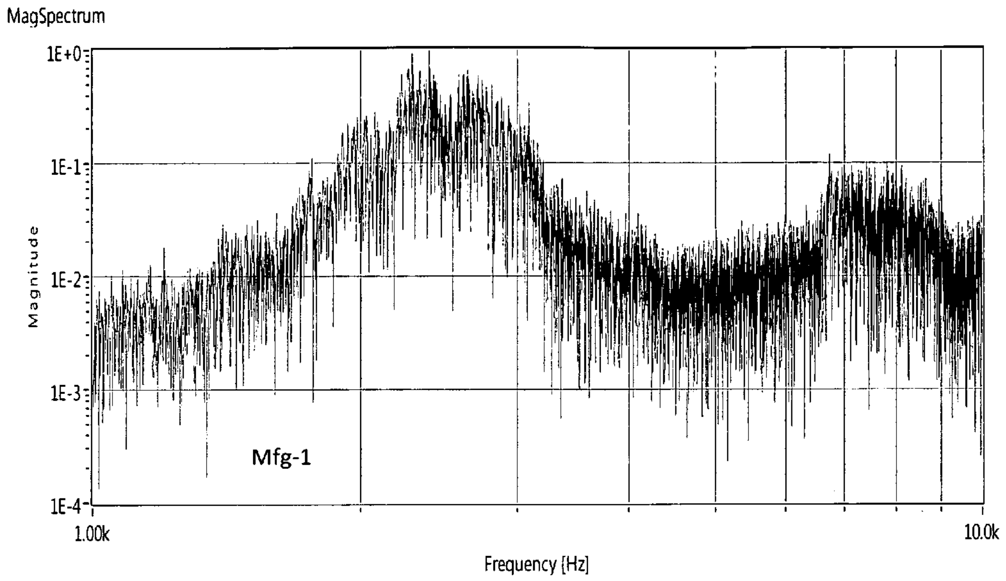
FIG. 11A-11E shows spectra for various commercial PASS devices.
Figure 11B:
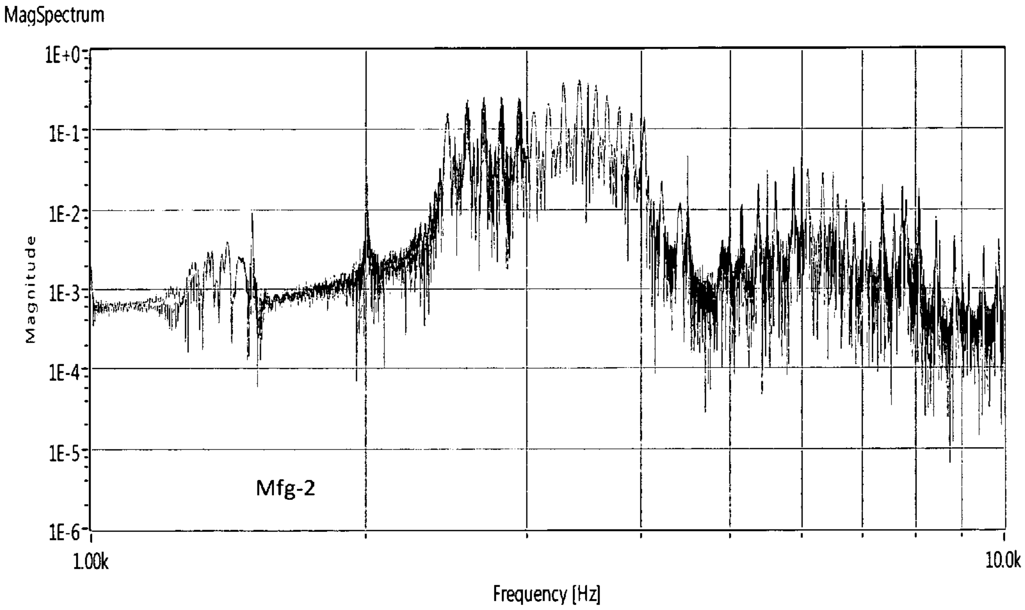
Figure 11C:
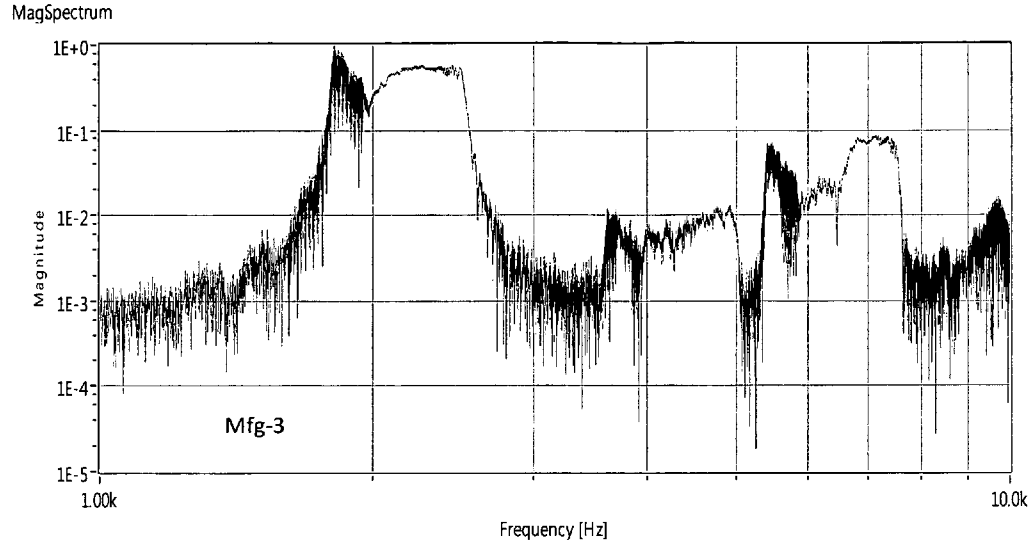
Figure 11D:
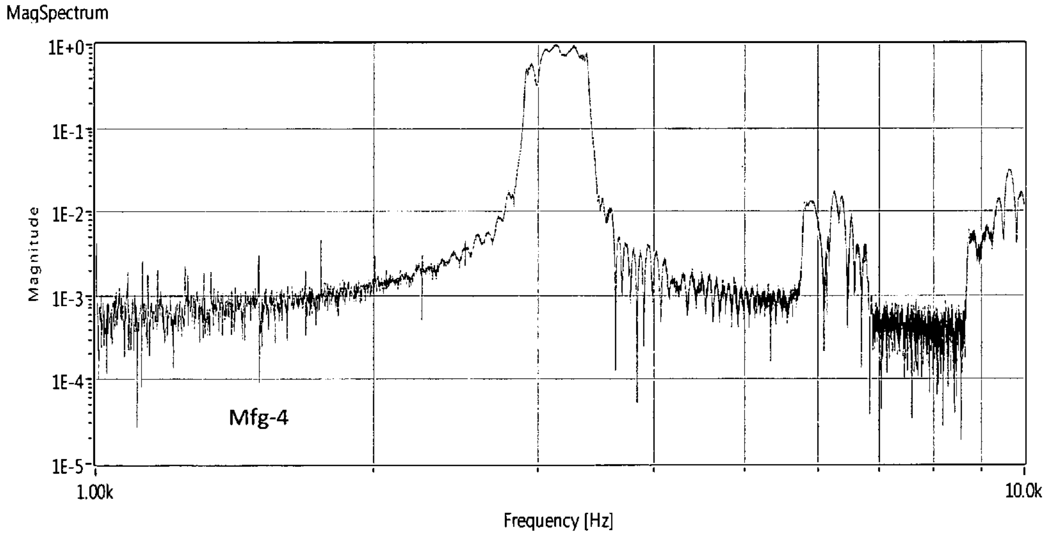
Figure 11E:
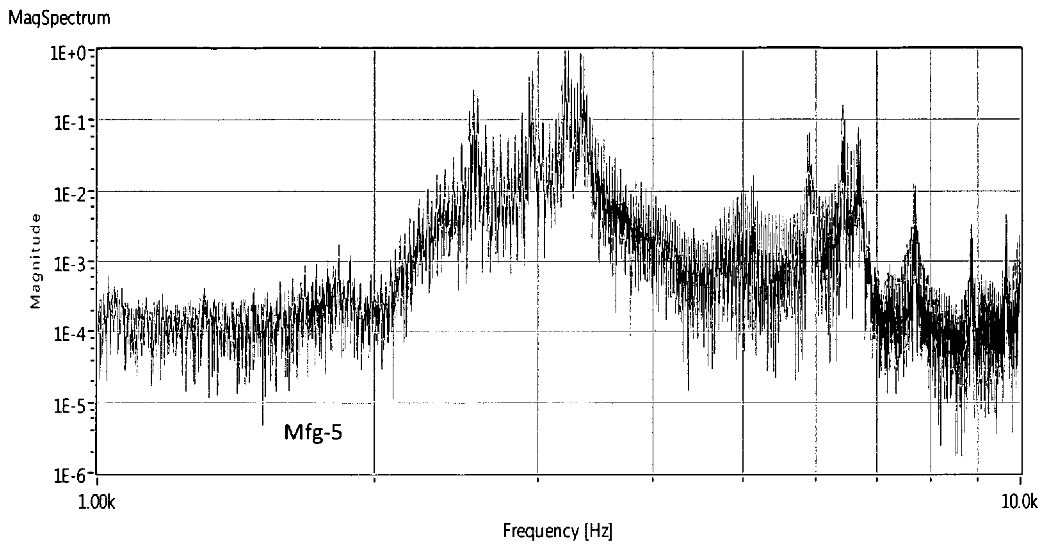
Figure 15A:
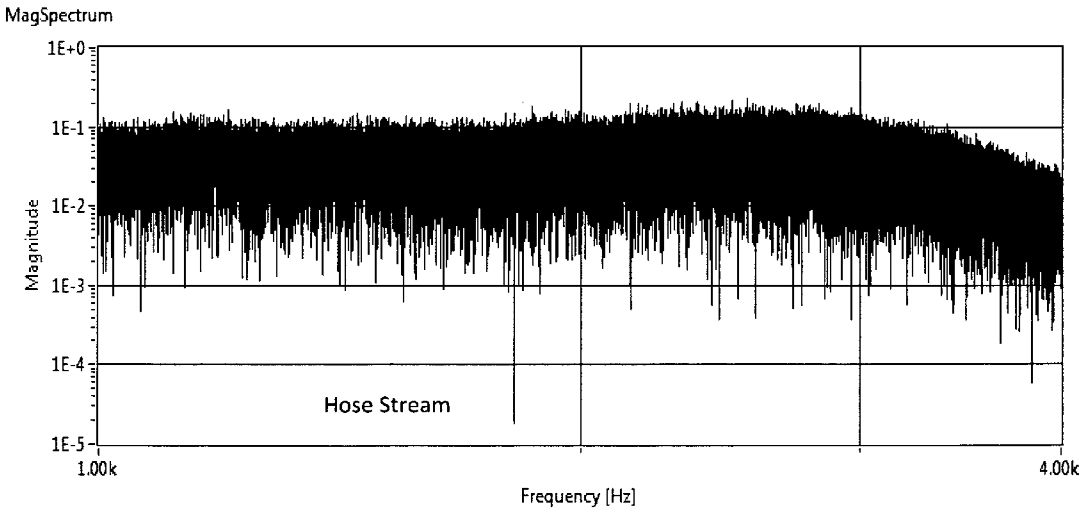
FIG. 15A-15I shows typical frequency spectra for fireground noises.

FIGS. 8-10 illustrate the dramatic improvement that can be obtained in an embodiment with a cross-correlation detector using a linear frequency modulation (LFM) chirp signal. FIG. 8 shows (upper waveform) a 5 ms transmit burst which starts at a frequency of 1 KHz and ends at a frequency of 4 KHz, the autocorrelation function (middle waveform), and the center peak with the horizontal scale expanded (lower waveform). The autocorrelation function of the chirp has a predominant single peak which is narrower by a factor of about 2.5 compared to that of the single-frequency burst of FIGS. 3 and 4, and consequently it would be even easier to determine the time of arrival to the desired 25 μs by noting the time of the center peak. Remarkably, FIG. 9 shows that if the burst length is increased to 1 sec (upper waveform), the autocorrelation function (middle and lower waveforms) does not change at all; this is in sharp contrast to FIG. 5. Perhaps even more surprising, if an echo of the same amplitude with a 2 ms delay (corresponding to a difference in path of only 2 feet) is added to the original waveform as shown in FIG. 10, the received signal (upper waveform) is drastically changed, but the cross-correlation function (middle trace) clearly shows the time of arrival of both signals (separated by 2 ms). Furthermore, the lower trace of FIG. 10 shows a negligible change to the center peak. Thus the cross-correlation detector should be able to detect the TOA of the first of the two echoes with sufficient accuracy to ultimately determine the direction of the source.

LFM Chirp with Resonant Transmitter

The discussion above has assumed that the transmit bursts can be generated with constant amplitude. However, most PASS devices generate the audible signal with a piezoelectric transducer element, which has a resonant behavior. Typical frequency spectra for five different manufacturers of PASS devices are shown in FIG. 11; for all curves, the horizontal (frequency) scale is logarithmic at 1 KHz/division from 1 KHz to 10 KHz and the vertical (magnitude) scale is logarithmic at 20 dB/division.

The plots of FIG. 11A-11E do not completely identify the extent of the resonance for several reasons. First, they are totally dependent on the frequency of the particular PASS sound and on the amplitude of the drive electronics; this is most apparent for the curve for Manufacturer 4. If the drive signal does not have any components at a particular frequency, the level would appear at the noise level (baseline). Second, the higher frequencies are most likely due to harmonics of the PASS signal, and would be expected to be lower in amplitude. In fact, the portion of the spectrum of the PASS device from Manufacturer 3 from about 5.4 KHz to 7.5 KHz appears to be the third harmonic of the signal from 1.8 KHz to 2.5 KHz (i.e., at three times the frequency). FIG. 11F provides estimates of the resonance parameters (center frequency, bandwidth, and Q) for each of the PASS devices. Since the tone for Manufacturer 4 does not appear to have any components below about 2.9 KHz, the higher estimated Q is probably not realistic; excluding that spectrum, the remaining PASS devices have an average Q of about 2.4 and a center frequency ranging from 2 KHz to 2.9 KHz.

The resonance of the PASS device transducer element causes two primary effects on the transmit acoustic burst. First, the amplitude will peak at the center frequency of the resonance. Second, the phase of the output signal will change, being +90° for frequencies below resonance and transitioning to −90° for frequencies above resonance.

Figure 12:
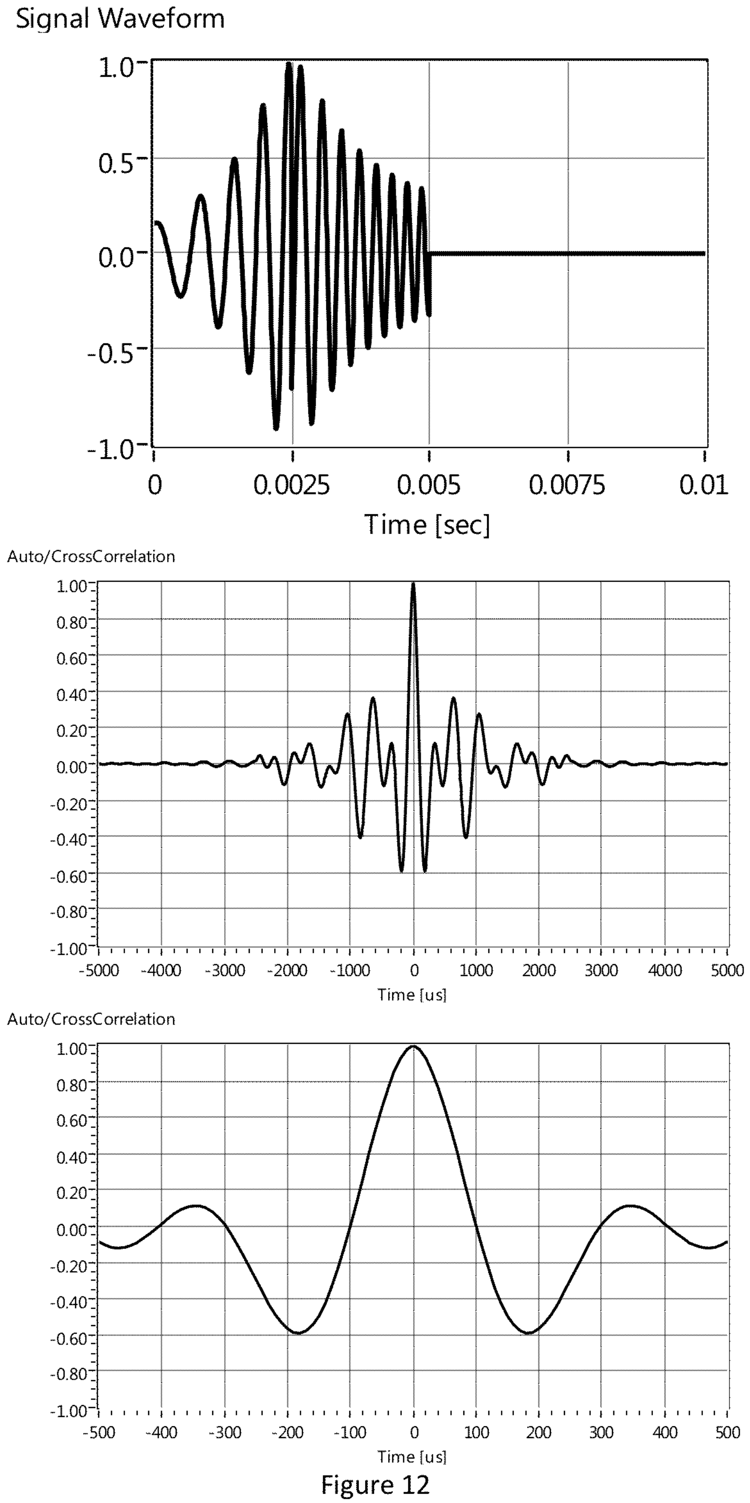
FIGS. 12-14 show the LFM chirps of FIGS. 8-10 with the added effect of piezoelectric transducer resonances.
Figure 13:
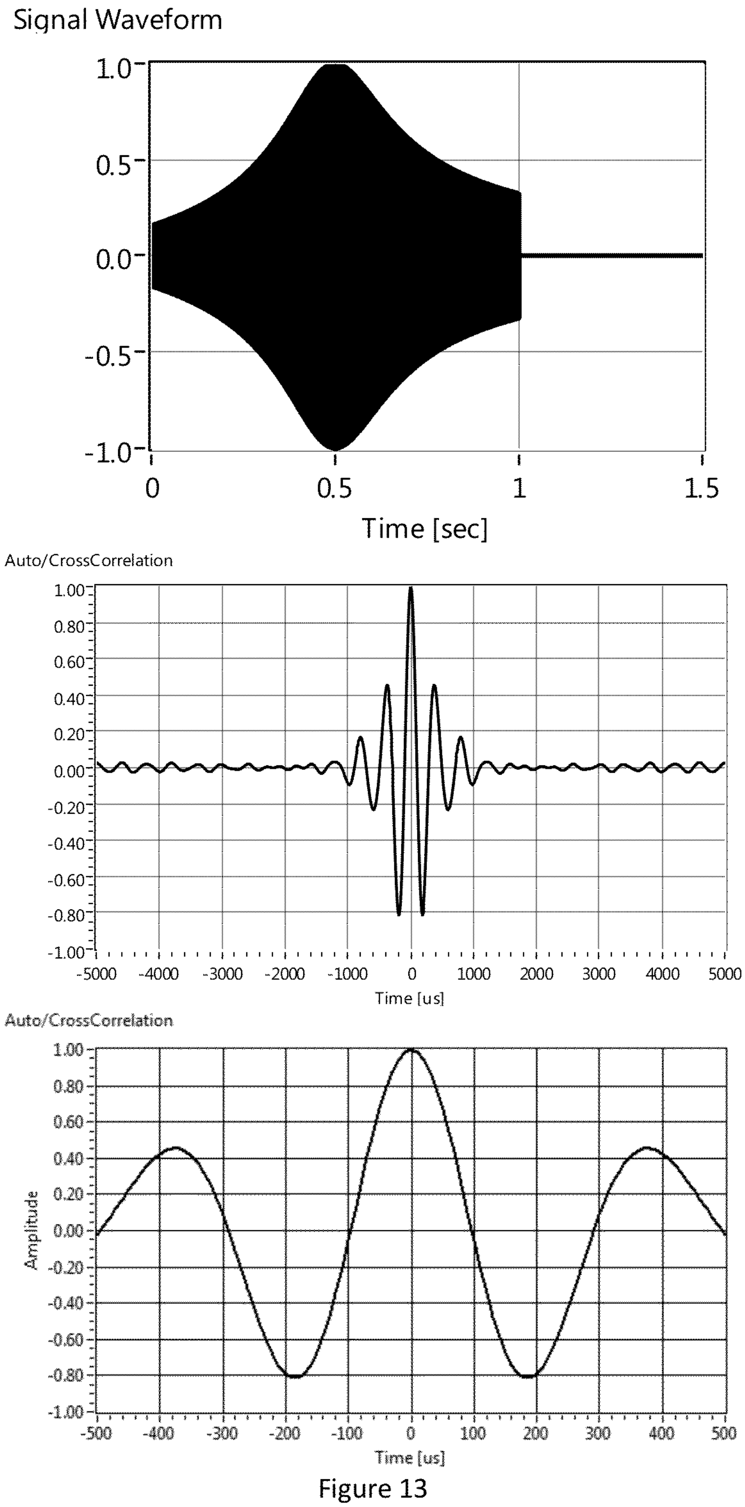
Figure 14:
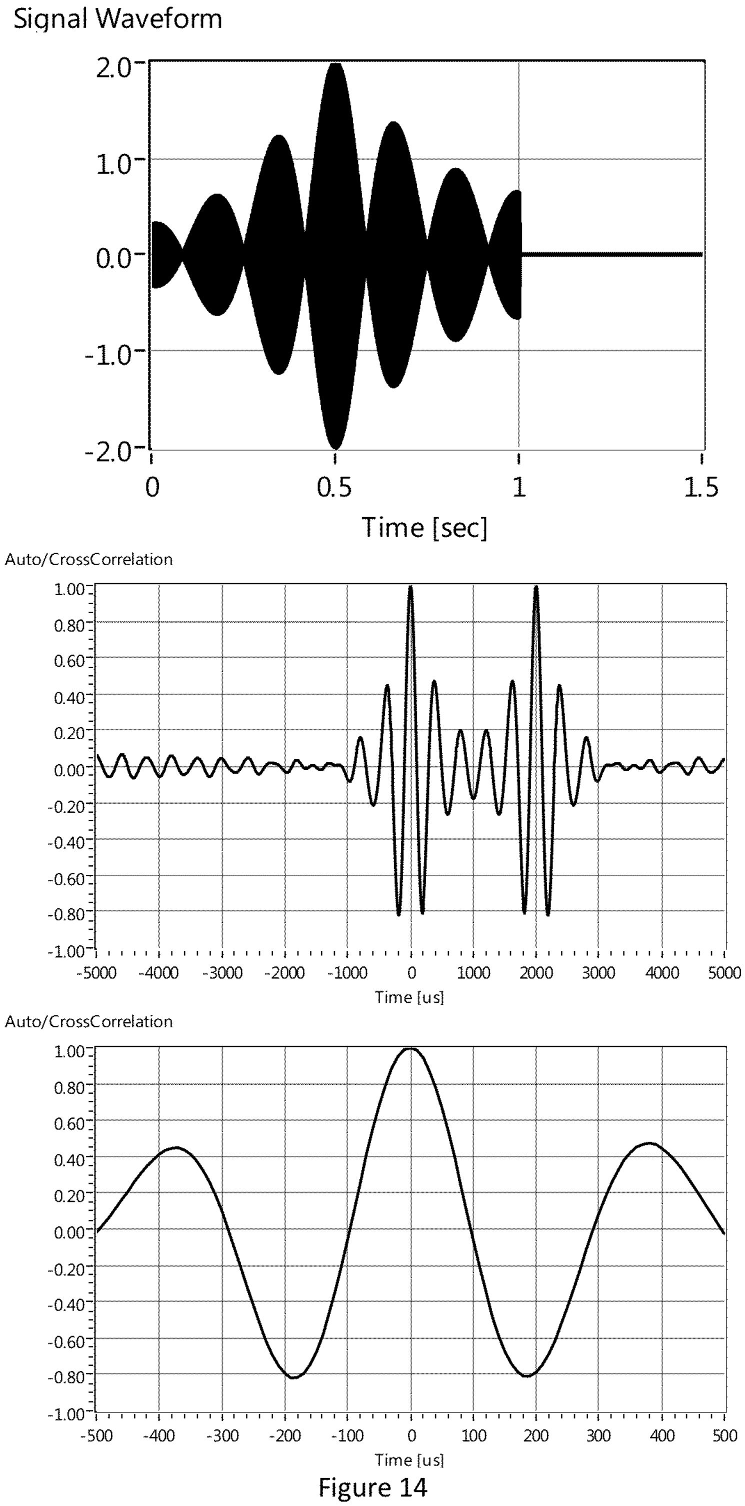
Figure 15B:
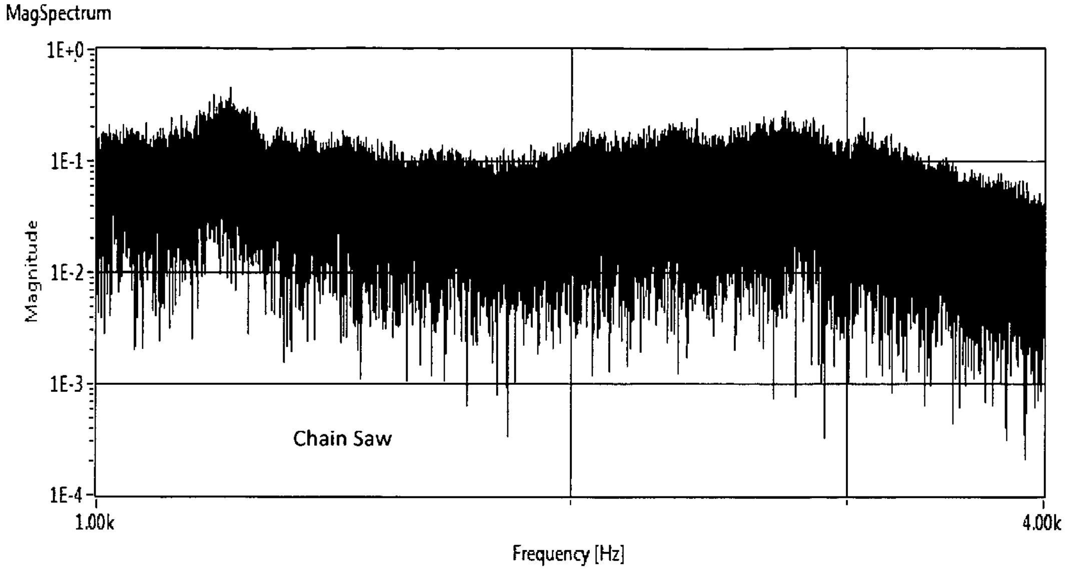
Figure 15C:
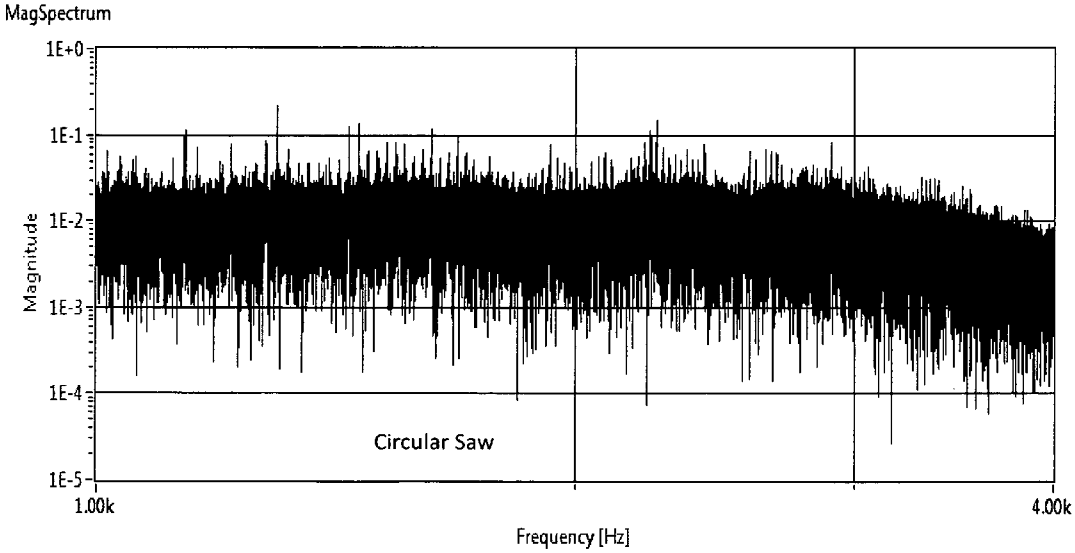
Figure 15D:
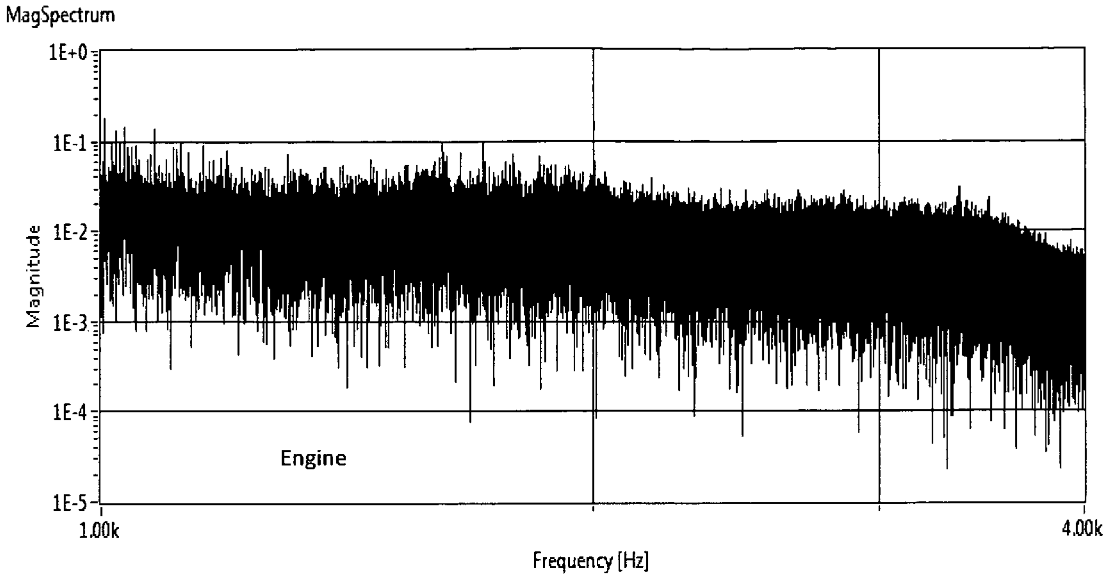
Figure 15E:
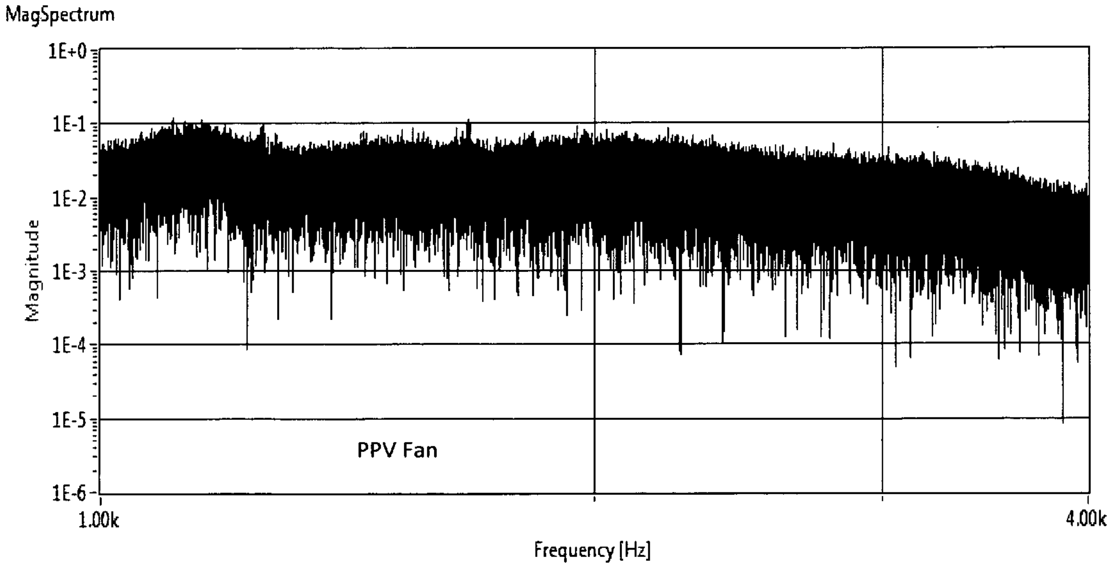
Figure 15F:
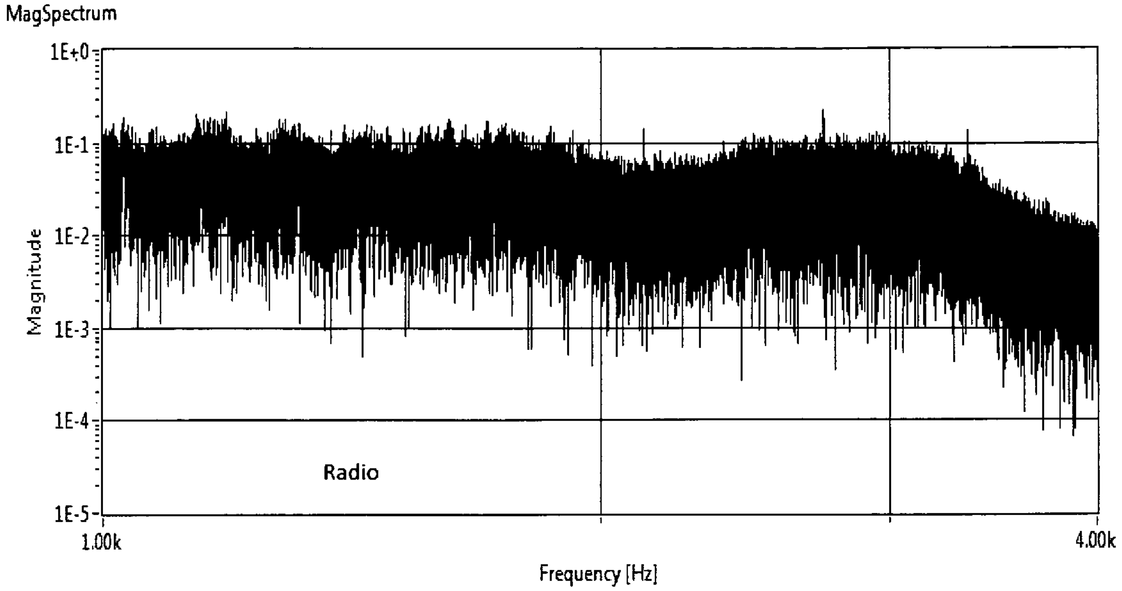
Figure 15G:
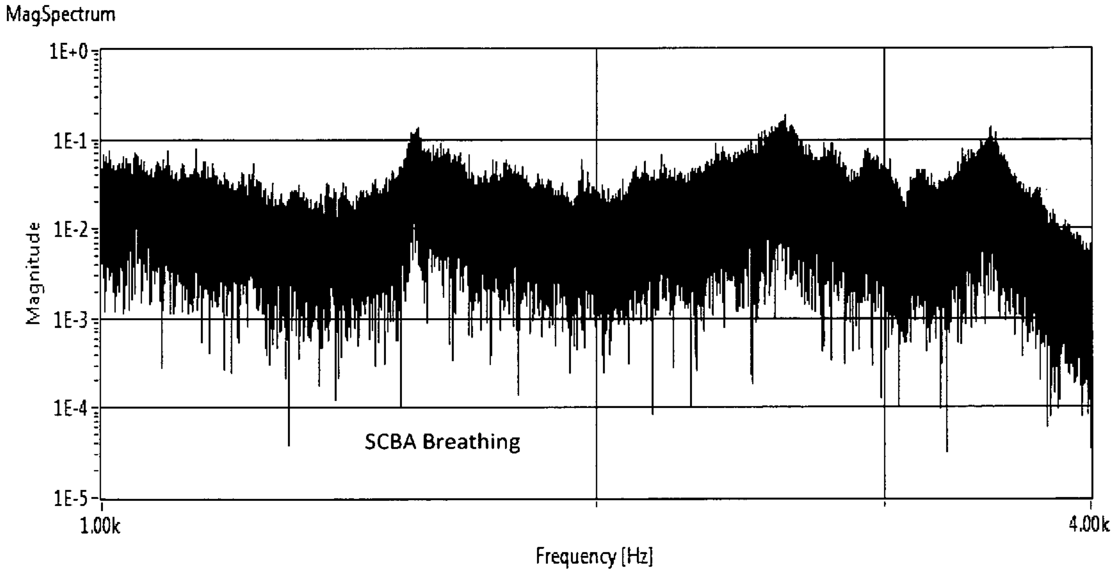
Figure 15H:
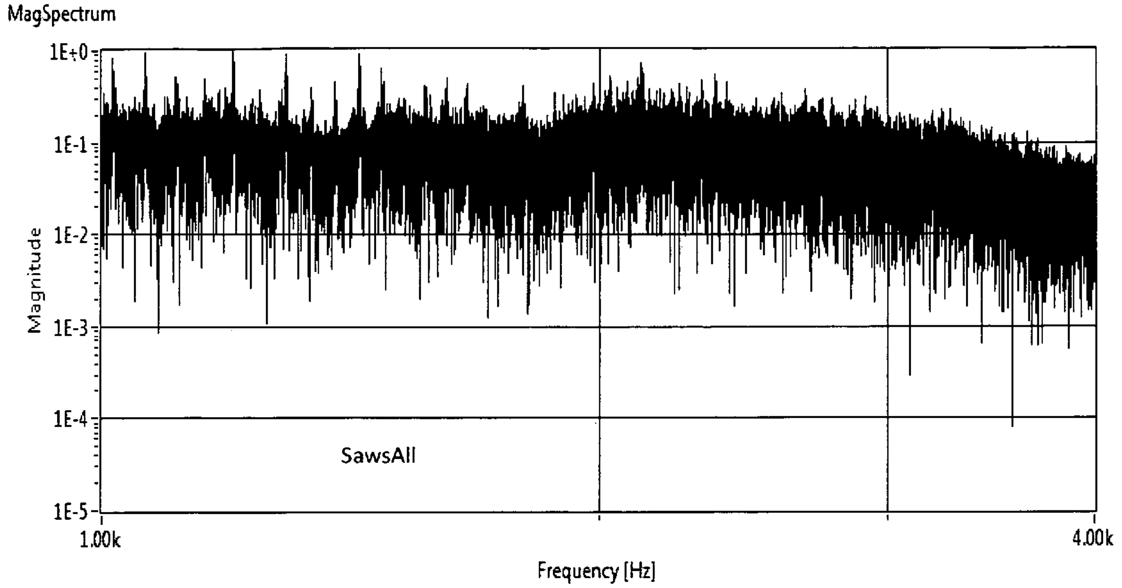
Figure 15I:
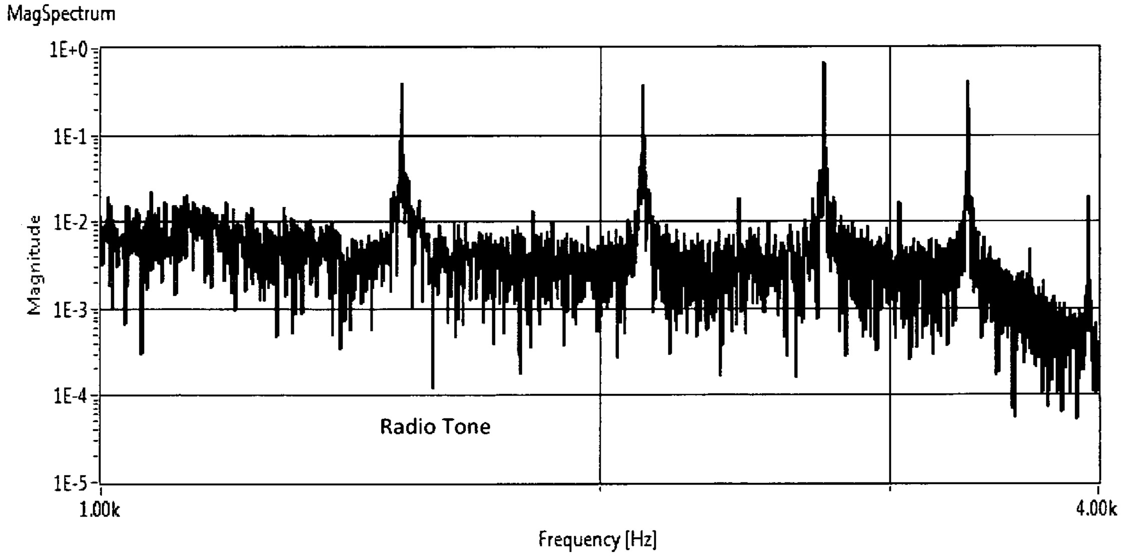

FIGS. 12-14 show the performance of the correlation detector assuming a transducer resonance at 2.5 KHz with a Q of 3.0, which would be a higher Q than typical of the commercially-available PASS devices. Comparing the upper trace of FIG. 12 to that of FIG. 8, the effect of the peaking of the resonance is readily apparent: when the frequency of the pulse is at the center frequency of the resonance, the amplitude is higher. The effect of the resonance on the correlation detector output (middle trace of FIG. 12) shows only a slight increase in the sidelobes compared to the that for the non-resonant signal (middle trace of FIG. 8); however, the center peak (lower trace of FIG. 12) is virtually identical to the lower trace of FIG. 12. As a result, the effect on the measurement of TOA would be negligible. FIG. 13 shows that the effects of the resonance for a longer chirp are similar to the effects for the short chirp (FIG. 12): the correlation detector output is virtually unchanged due to the longer chirp. Comparing FIG. 14 to FIG. 10, the cross-correlation detector output in a high-multipath environment would be minimally affected by the resonance. Thus the use of a resonant piezo transducer in a PASS device would have minimal effect on the ability of a cross-correlation detector to accurately detect the TOA of the PASS signal. We therefore conclude that a three-sensor AOA device (as shown in FIG. 1) would be able to achieve the required 25 μs resolution and determine the direction of the sound source on the order of 15°, which would be sufficient to lead rescuers to the alarmed PASS device.

Effects of Additive Noise on LFM

The discussion above has shown that the cross-correlation detector would be able to accurately determine the TOA of the first received burst if a linear FM chirp is used as the source signal in a noise-free environment. However, the fireground typically has additional sources of sounds that would be considered noise to the correlation detector. FIG. 15A-15I shows the spectrum from 1 KHz to 4 KHz for typical sounds encountered at fire scenes, including (1) hose stream, (2) chain saw, (3) circular saw, (4) engine, (5) Positive Pressure Ventilation (PPV) fan, (6) radio, (7) Self Contained Breathing Apparatus (SCBA) breathing, and (8) Sawsall. Most of these signals have relatively constant amplitude over the frequency band. An exception would be if the radio has an annunciation tone; in this case the spectrum would have peaks at the particular frequency components of the tone as shown. The vertical scale for all curves of FIG. 15 is logarithmic at 20 dB/division.

Figure 16:
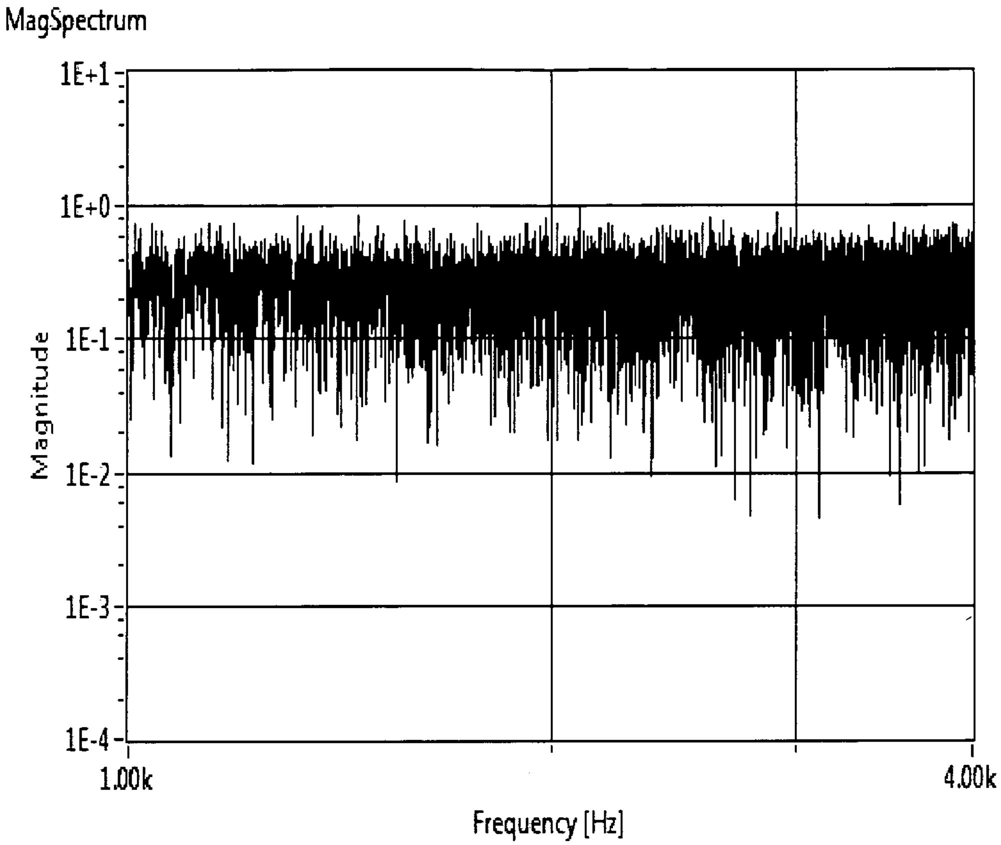
FIG. 16 shows the frequency spectrum of white noise.
Figure 17A:
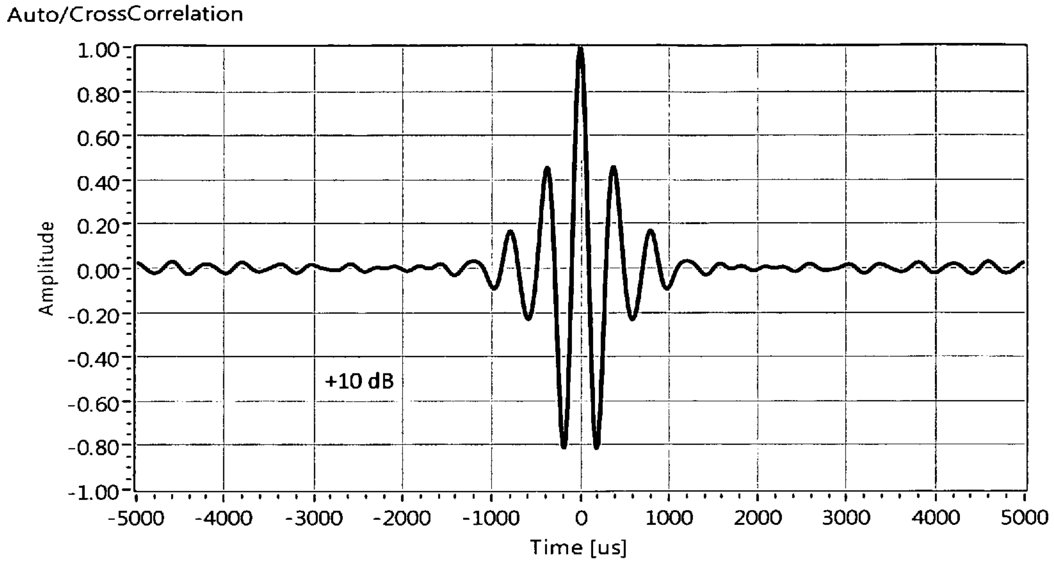
FIG. 17A-17F shows the autocorrelation of a chirp waveform with various amounts of additive white noise.
Figure 17B:
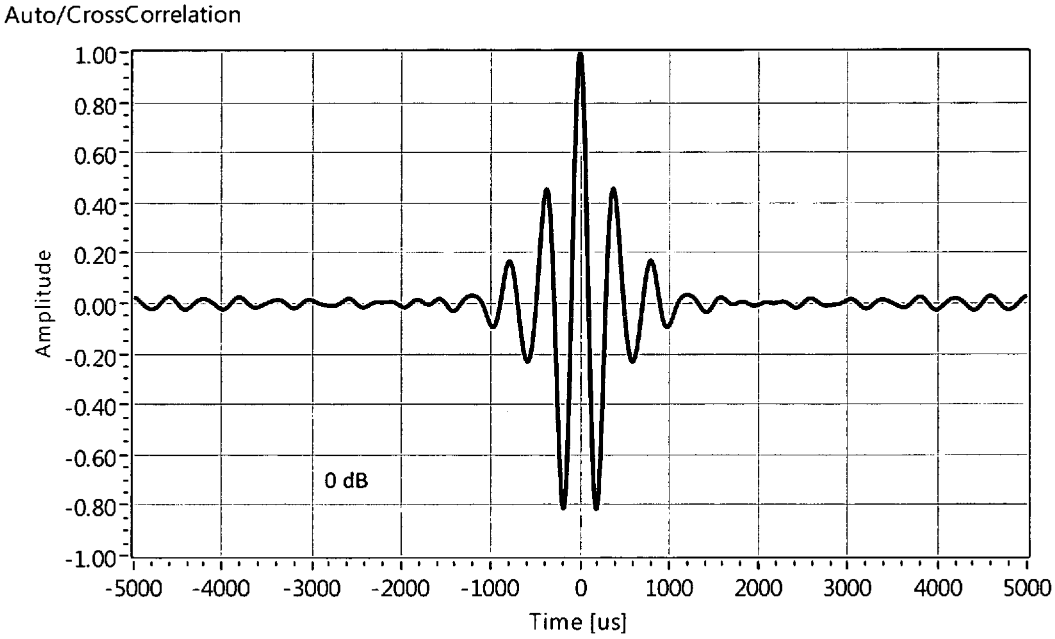
Figure 17C:
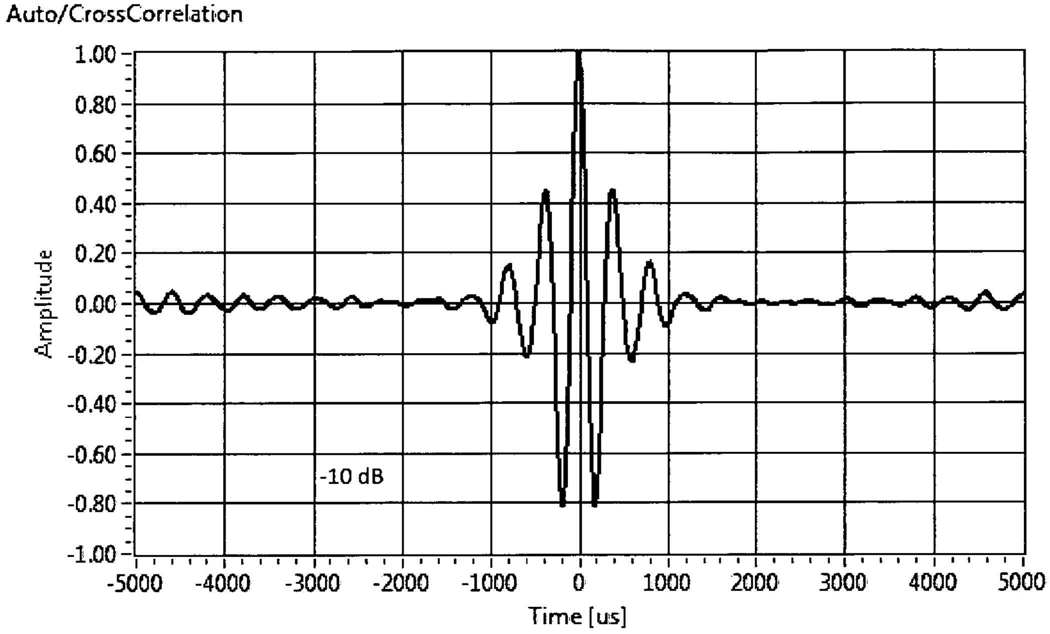
Figure 17D:
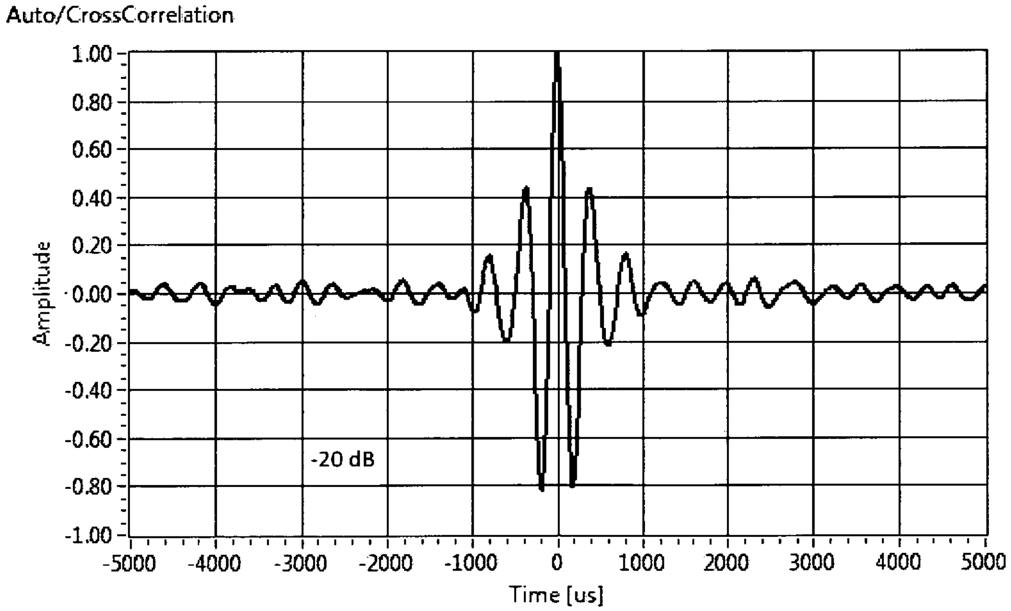
Figure 17E:
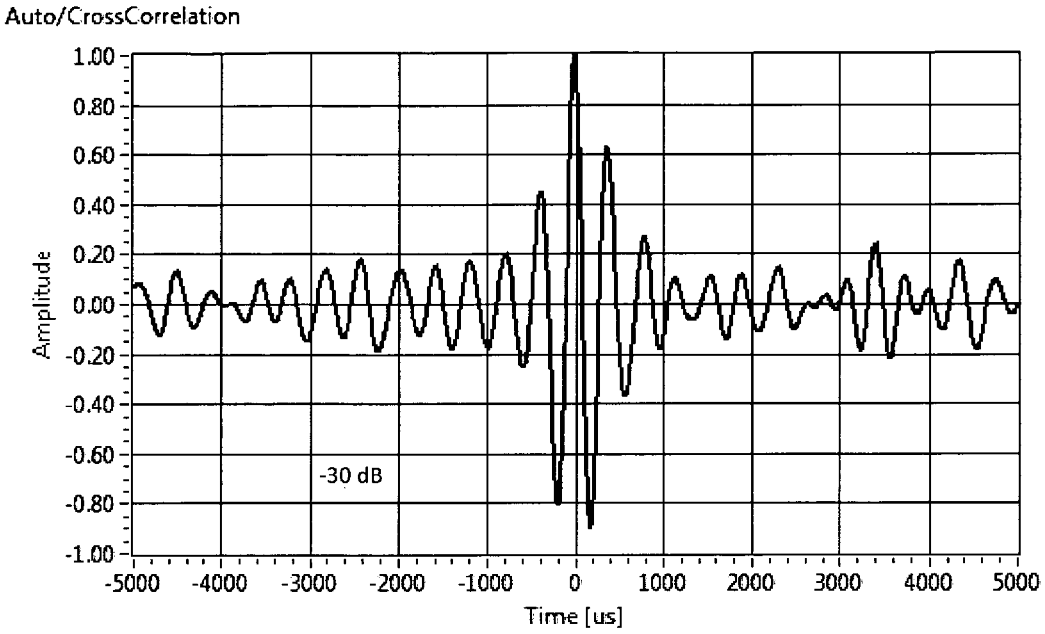
Figure 17F:
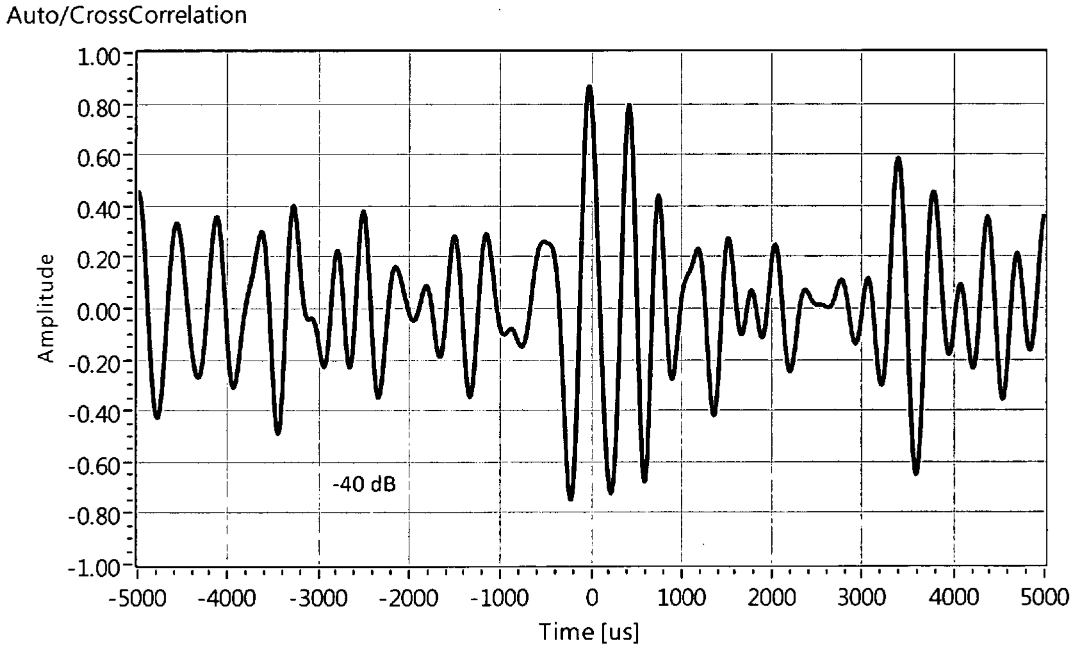

In addition to the fireground sounds, any electronic system, such as the microphone sensors and preamplifiers, will have internal noise which is typically "white," meaning it has constant amplitude for all frequencies, as illustrated in FIG. 16. Since the PASS alarm sounds are defined as spanning a frequency range from 1 KHz to 4 KHz, the bandwidth of the sensors would be limited to this range in order to minimize the total noise. Furthermore, only the section from 1 KHz to 4 KHz for all the fireground sounds would be of concern since the microphone preamplifier would also limit their bandwidth.

FIG. 17 shows the affect on the cross-correlation output when different levels of band-limited white noise are added to a single chirp which lasts 1 second and repeats every 2 seconds without multipath echoes. The chirp sweeps from 1 KHz to 4 KHz, and the sound generator is a resonant device with a center frequency of 2.5 KHz and a Q of 3. For a Signal-to-Noise Ratio (SNR) of +10 dB, the signal has ten times the power of the noise and would be perceived as having twice the loudness of the noise. As the noise is increased in 10 dB steps, the noise would appear to increase in loudness by factors of two. At 0 dB, the noise and the signal have equal powers and would appear to have the same loudness. Comparing the curves of FIG. 17, no apparent change in the correlation output signal occurs for SNR greater than 0 dB. Even at −10 dB and −20 dB, only slight changes occur in the sidelobes. By −30 dB, the noise would appear to be 8 times as loud as the signal, and noticeable changes are beginning to occur in the sidelobes, varying on the order of ±0.2; at this level, the center peak stands out from the sidelobes, and reliable detection of the TOA of the wave may be difficult but certainly possible. At −40 dB, the sound would appear to be only 1/16 as loud as the noise, and changes in the amplitude of the sidelobes are on the order of ±0.3 or higher; these significant variations would suggest that the TOA detection would be very difficult. Thus a SNR of about −30 dB represents the minimum SNR level for reliable TOA determination in the presence of white noise for the particular chirp signal. Note that at a SNR of −30 dB, the total sound pressure level (SPL) would vary by about 3% due to the PASS signal; reliable detection based purely on SPL, such as described in U.S. Pat. No. 7,639,147 B2 by Berezowski et al., would be virtually impossible.

The combination of (1) a minimum requirement of −30 dB SNR for reliable TOA measurements, and (2) the NFPA requirement to have a minimum sound pressure level of 95 dBA at 3 meters (9.9 feet), provides a method to estimate the maximum detection distance for a PASS device using a cross-correlation detector as a function of the ambient noise sound pressure level (SPL). FIG. 18 summarizes the results for a white noise source. For example, the cross-correlation detector would accurately determine the TOA in the presence of noise at 95 dBA (the sound level of a PASS at 3 m) with the PASS device located at a distance of approximately 95 m (311 feet). In contrast, a firefighter would begin to notice the sound of a PASS device at a SNR of approximately −5 dB; this would occur with the PASS device located at a distance of only 5.5 m (18 ft). Thus the use of a cross-correlation detector with a chirp acoustic waveform would extend the detection range by 311 ft/18 ft, or a factor of 17 over that of the firefighter's auditory capability. Since the two curves of FIG. 18 are parallel, this implies that the use of the cross-correlation detector with the acoustic chirp would maintain this factor of 17 independent of the noise level. That is, in all situations, the cross-correlation detector would detect the alarmed PASS device at significantly greater distances than possible by ordinary hearing; in addition, the use of multiple microphones as in FIG. 1 would enable the system to determine the direction of the alarmed PASS device. For comparison, FIG. 18A show typical sound pressure levels reported for some common sources[1].

[1] http://www.sengpielaudio.com/TableOfSoundPressureLevels.htm

Chirp Rate Sensitivity of LFM

Figure 19:
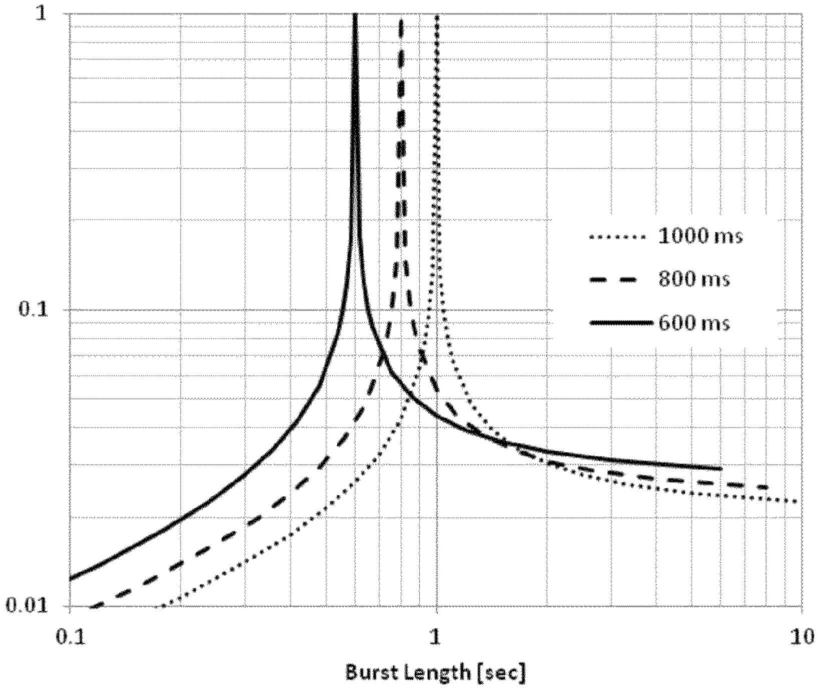
FIG. 19 shows the sensitivity of the chirp rate for LFM (Linear Frequency Modulation).

FIGS. 8-10 and 12-14 demonstrated that the cross-correlation output is unaffected by the duration of the chirp as long as the reference image matches the received signal. This is equivalent to saying that the chirp rate for both the received signal and the reference image match (and that both are either up-chirps or down-chirps). FIG. 19 shows the result if the two differ in chirp rate: a mismatch of only 3% causes the output of the correlation detector to be reduced by more than a factor of 10. Thus the cross-correlation detector is highly selective and quite sensitive to any mismatch in the chirp rate.

This high sensitivity to chirp rate for LFM implies that a system could be designed to accommodate a number of different chirps. For example, different acoustic transmitters could be coded with different chirp rates and be individually sensed by the correlation detector. FIG. 19 shows the normalized output of the correlation detector for three different chirp rates (600, 800, and 1000 ms) with the same frequency spread (1 KHz to 4 KHz). The contributions from a "mismatched" chirp would be on the order of 0.05 compared to that of the "matched" chirp for this particular combination of chirp rates.

Chirps could also be distinguished by the direction of the chirp: up-chirps would not correlate well with down-chirps. Thus the technique of using different chirp rates could be extended to two groups of different chirp rates.

The high sensitivity to chirp rate for LFM also implies that the system would be negatively impacted by Doppler shift, which would occur if the source and/or the detector were moving. Thus the use of LFM would need to be restricted to low-Doppler situations. While this restriction may be marginally acceptable to firefighting, an alternative type of chirp (discussed in the next section) would be preferred.

Pulse Compression with LPM: Linear Period Modulation

Generation of a high-quality, linear frequency modulation chirp would require a circuit with the ability to accurately control frequency in a linear manner. Unfortunately, many of the techniques such as direct digital synthesis (DDS) are complicated and require high time resolution. In contrast, it is quite easy to accurately control the period of a signal using low-cost microprocessors such as the PIC12F629 manufactured by Microchip Technology, Inc., of Chandler, Ariz. For example, generating a square-wave drive with successive cycles of 1000 μs, 998 μs, 996 μs, etc., can be done with a very simple program; high accuracy would be achieved by using a crystal oscillator for the microprocessor.

Figure 20A:
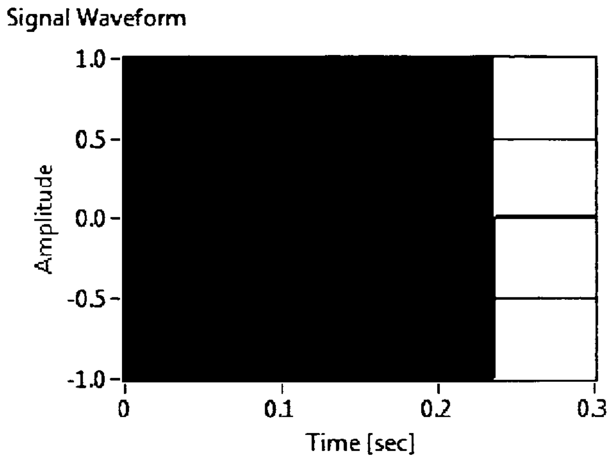
FIG. 20A-20C provides signal waveform and autocorrelation function for an LPM (Linear Period Modulation) chirp.
Figure 20B:
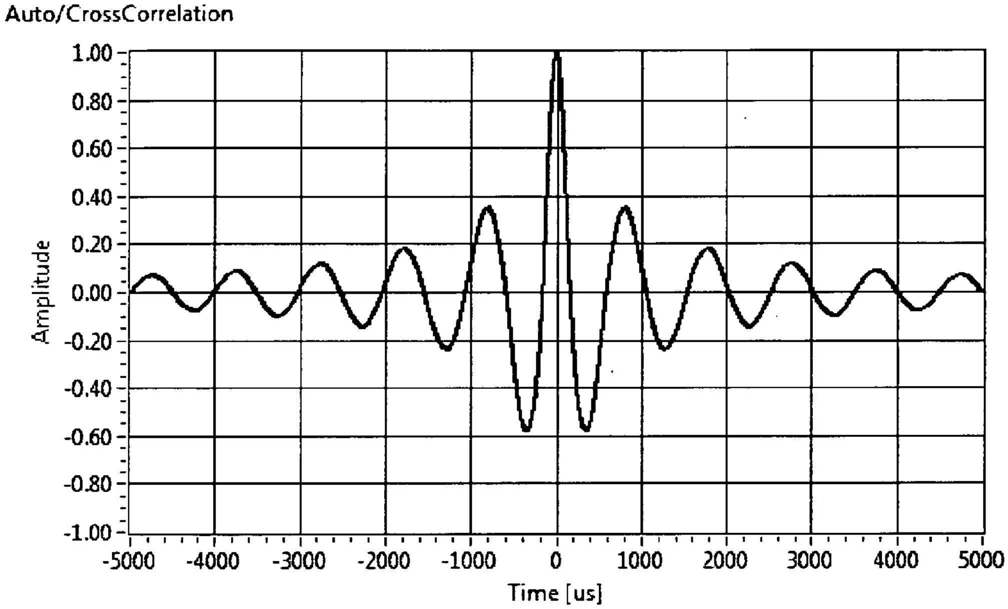
Figure 20C:
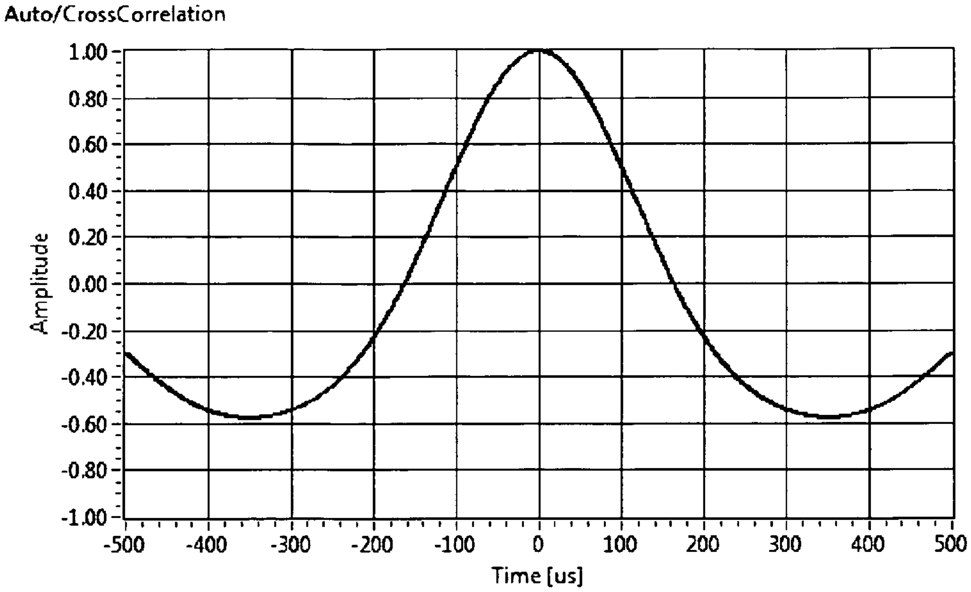
Figure 21A:
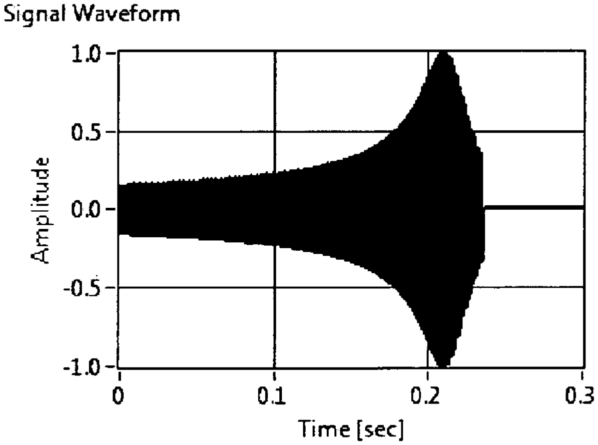
FIG. 21A-21C shows the effect on FIG. 20 for a resonant piezoelectric transducer.
Figure 21B:
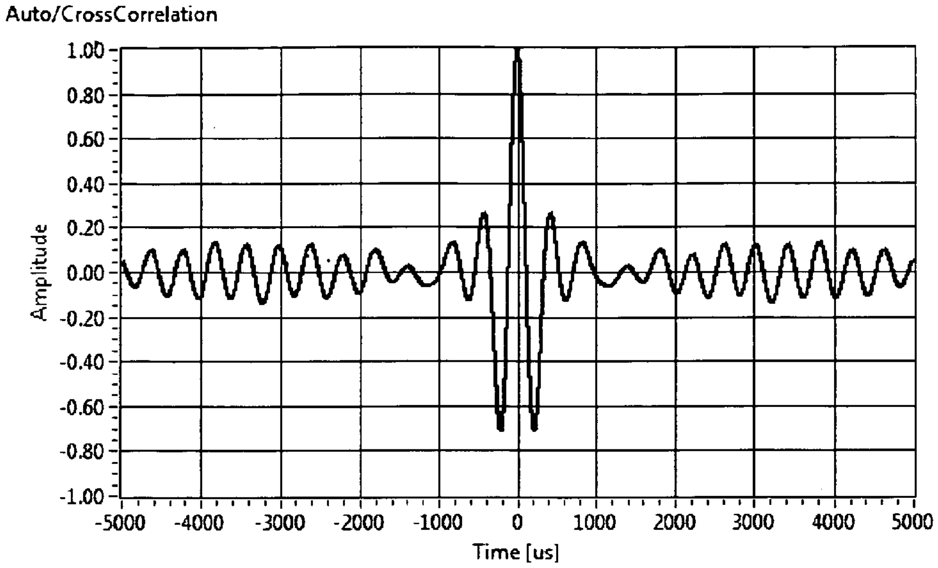
Figure 21C:
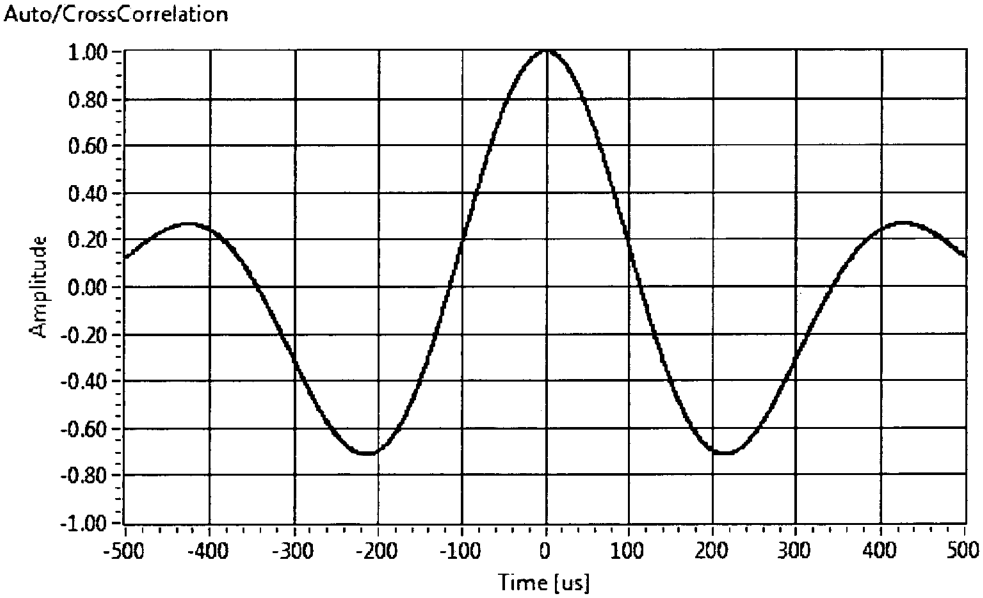
Figure 22A:
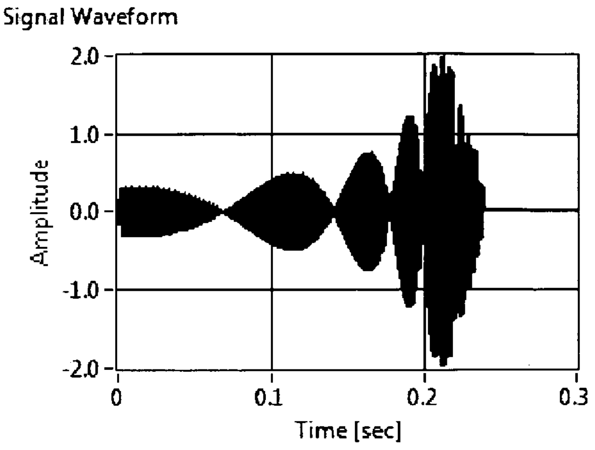
FIG. 22A-22C shows the effect of an additive echo on the system of FIG. 21 due to multipath.
Figure 22B:
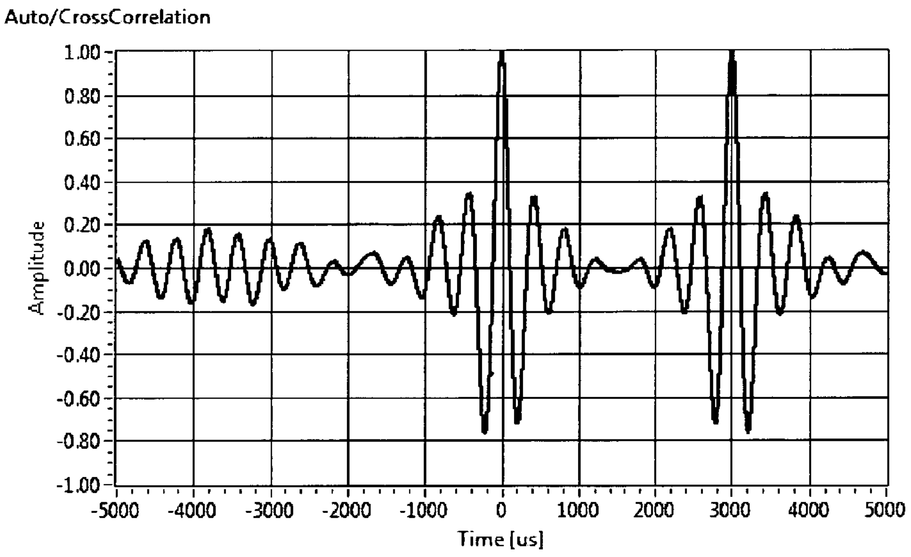
Figure 22C:
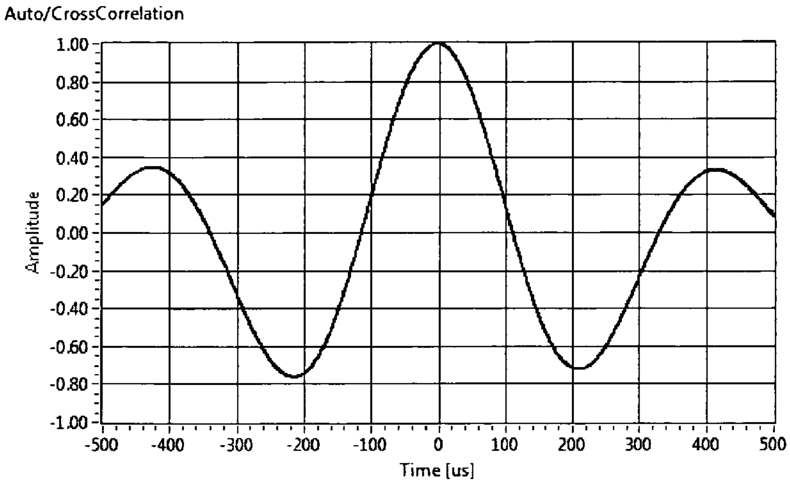

Linear period modulation (LPM) forms of chirps have a number of advantages over LFM, including insensitivity to Doppler shift. In fact, certain bats use LPM chirps to their advantage in detecting and tracking insects. FIGS. 20A-C, 21A-C and 22A-22C show the performance of the correlation detector for LPM chirp signals. For a non-resonant situation, FIG. 20 shows that the sidelobes of the autocorrelation waveform are slightly higher and the center peak is slightly wider than for LFM (from FIGS. 8 and 9), suggesting that LFM would perform better. However, the situation changes for a resonant transducer: FIG. 21 shows that the sidelobes for LPM are actually lower than for LFM (FIGS. 12 and 13) and that the width of the center peak is approximately the same as for LFM. The differences between LFM and LPM are clear in the actual drive signals: for LFM the peak at 2.5 KHz is near the center of the burst (FIG. 13, top waveform), whereas the peak for LPM is near the end (FIG. 21, top) for the same resonant frequency and Q. FIG. 22 shows that the response to a multipath echo is readily distinguished from the primary signal using LPM, indicating that LPM and LFM are comparable in this respect.

Figure 23A:
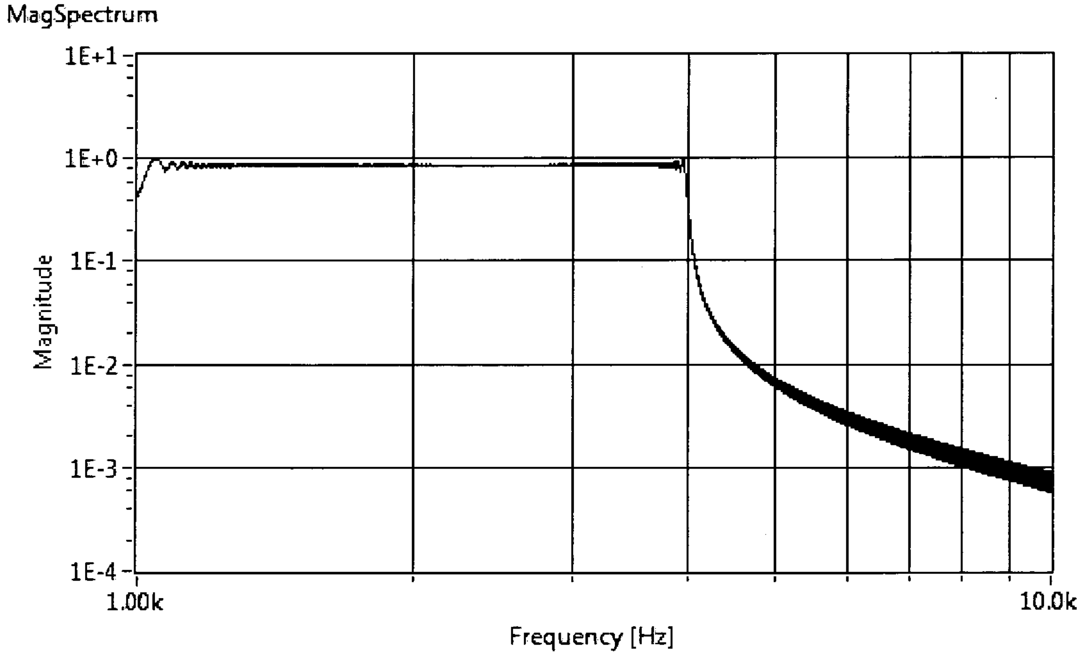
FIGS. 23A-23B and 24A-24B show LFM and LPM spectra with and without the effect of piezoelectric transducer resonance.
Figure 23B:
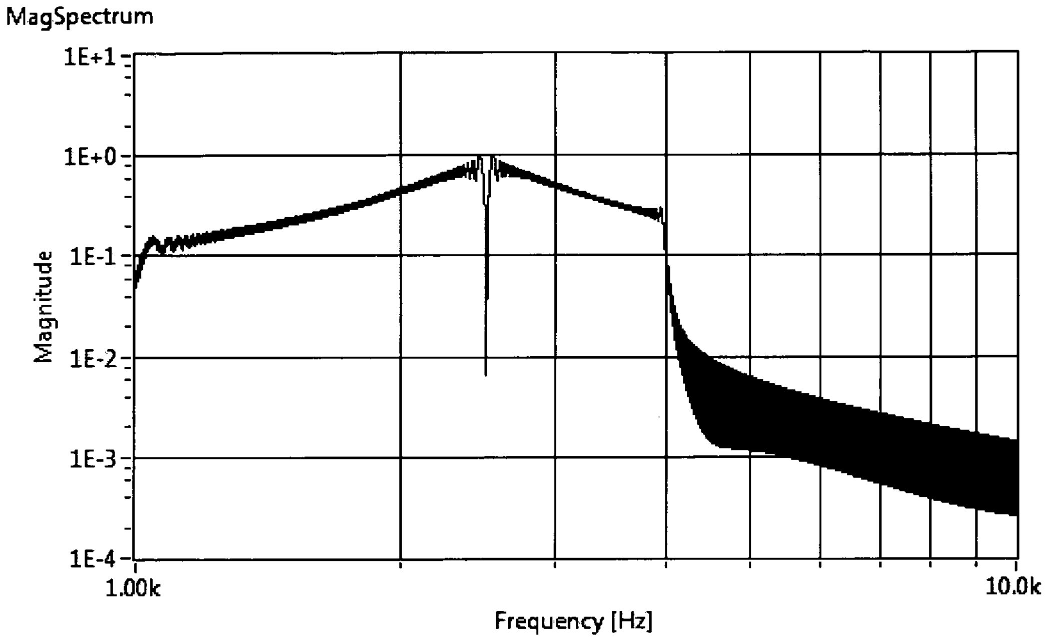
Figure 24A:
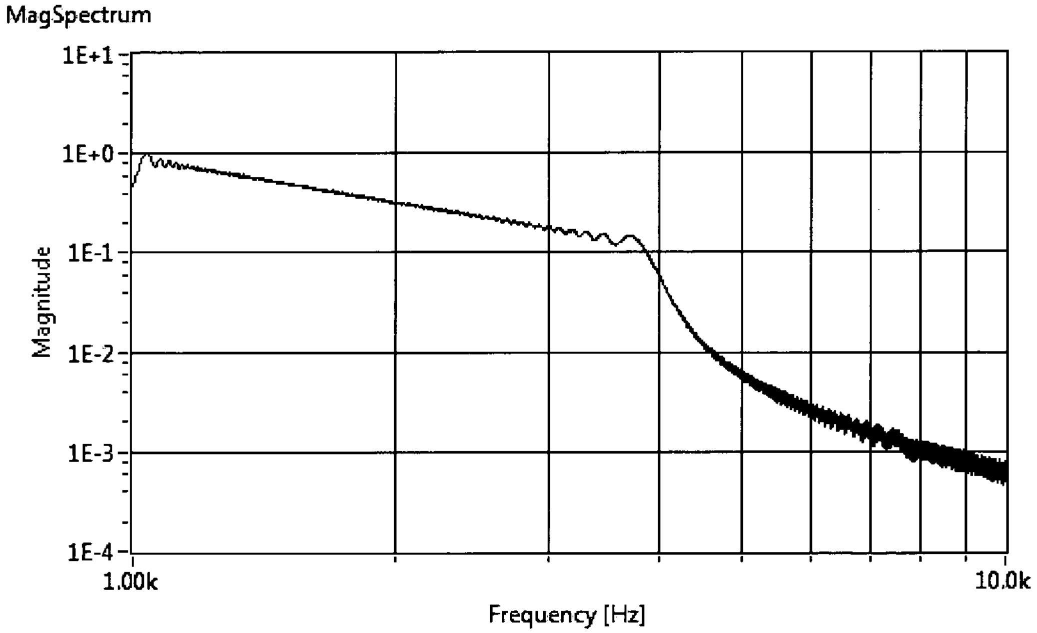
Figure 24B:
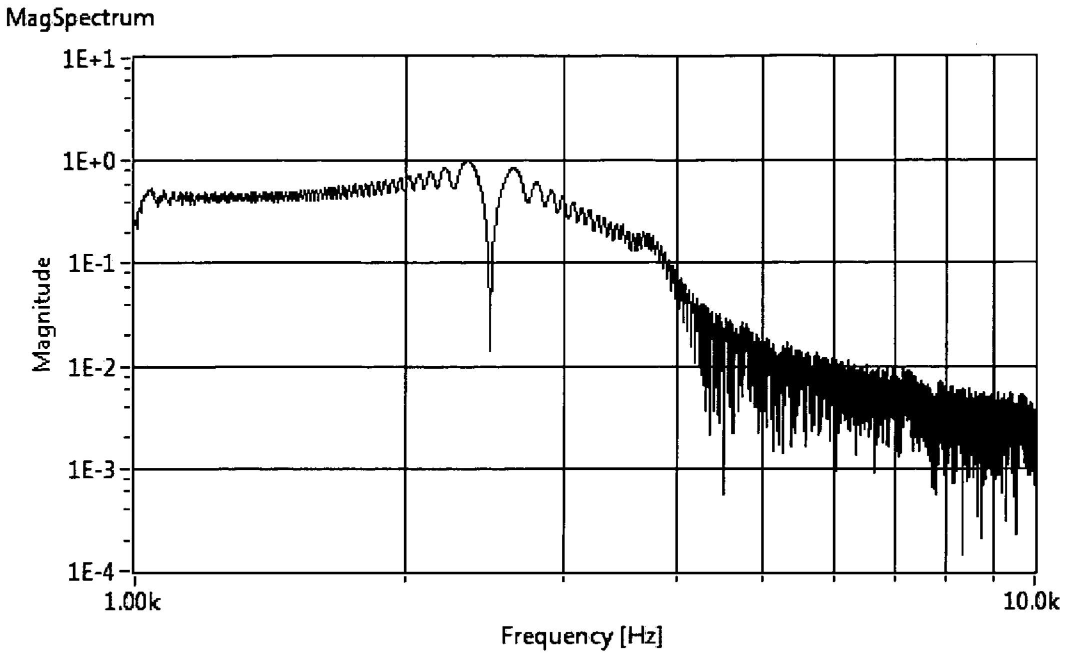

The spectrum of LPM (FIG. 24A-24B) is different from that of LFM (FIG. 23A-23B): for the non-resonant situation (top curves), LFM is flat in frequency (from 1 KHz to 4 KHz in the example), whereas LPM drops logarithmically; since LPM spends more time at the lower frequencies, the spectrum is higher at the low end. Note, however, that the effect of the resonance (lower curves) compensates at low frequencies and is responsible for the improvement in the width of the center peak of the correlation waveforms in FIGS. 21 and 22.

It can be noted that the correlation sidelobes for LPM (FIG. 21) are actually lower than for LFM (FIG. 13) when a resonant transducer is generating the sound (as is typical for PASS devices). Thus the cross-correlation detector would be expected to perform better for measuring the time of arrival of the signal if the chirp signal is LPM.

The cross-correlation detector's performance in the presence of additive white noise is approximately the same for both LFM and LPM. A SNR on the order of −30 dB would be required for reliable detection of time of arrival.

Improved TDOA Determination

The above discussion has focused on the use of the center peak of the correlation detector waveform for accurate determination of the time-of-arrival (TOA) of the primary wave from the PASS device and to distinguish it from subsequent echoes. However, in order to determine the angle-of-arrival (AOA) of the wave using multiple sensors, the time-difference-of-arrival (TDOA) between the sensors is required. As a result, any error in the TOA estimate would be tolerated if the same error occurred for all of the sensors; i.e., the errors for the individual sensors would cancel when the difference is calculated.

Other characteristics of the cross-correlation detector output could also be used instead of the center peak. For example, instead of using the time for the actual peak of the center pulse, an embodiment could instead use the phase of the correlation-detector output. For example, the zero-crossing of the signal either before or after the peak could be used as a measure of the phase of the cross-correlation function as long as the technique was used for all of the sensor signals. Similarly, the phase could be determined based on the zero crossings of the waveform several cycles away from the peak as long as the technique was used for all of the sensor signals.

The technique of using the phase (or zero-crossings) rather than the center peak for TDOA estimates is limited primarily by two issues. The first relates to the extent of multipath in the environment. If echoes are generated by waves that emanate from directions that are significantly different from the primary wave, (e.g., from the opposite direction), the zero-crossings for the TDOA measurements should be taken from times prior to the center peak to ensure that the subsequent echoes do not affect the measurement. This suggests that the total duration of the autocorrelation signal should not be so long as to confuse the approximate time of the peak from the primary wave.

The second issue that limits the zero-crossing technique concerns how to make sure that all sensors use the same cycle for measuring the time of the zero-crossing. It can be shown that if the spacing between the sensors (i.e., "D" in FIG. 1) is less than a half wavelength corresponding to the equivalent frequency of the center peak of the autocorrelation function of the chirp, there would be no ambiguity as to which zero-crossing to use: the closest one is the correct one. This puts a limit on the maximum value of D. For example, for a chirp from 1 KHz to 4 KHz using LPM using a resonant transducer with a center frequency of 2.5 KHz and a Q of 3, the period of the center peak of the autocorrelation function is approximately 420 μs, corresponding to a frequency of 2.38 KHz and a wavelength of 5.6" (143 mm); hence the spacing of the sensors must be less than 2.8" (71 mm).

Figure 25:
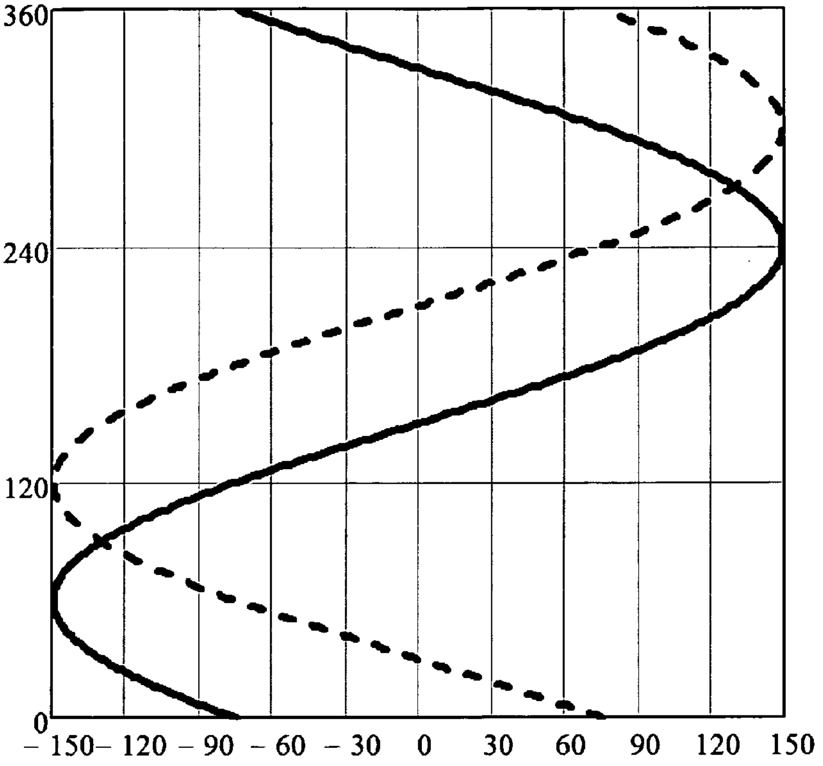
FIG. 25 shows a method to determine TDOA (Time Difference of Arrival) using Sensors 2 and 3.

For a three-sensor system using time-difference-of-arrival (TDOA) to determine angle-of-arrival (AOA) as illustrated in FIG. 1, the cross-correlation signal from one of the sensors must be used as a time-of-arrival (TOA) reference and subtracted from the TOA of the remaining two sensors to form two TDOA signals. FIG. 25 shows the angle-of-arrival as a function of the TDOA for Sensor 2 (solid curve) and Sensor 3 (dashed curve) relative to Sensor 1 if the sensor spacing is set to 2.0 inches. Each of the two TDOA signals will vary from −150 μs to +150 μs as the angle-of-arrival varies over a range from 0 to 360°.

Figure 29:
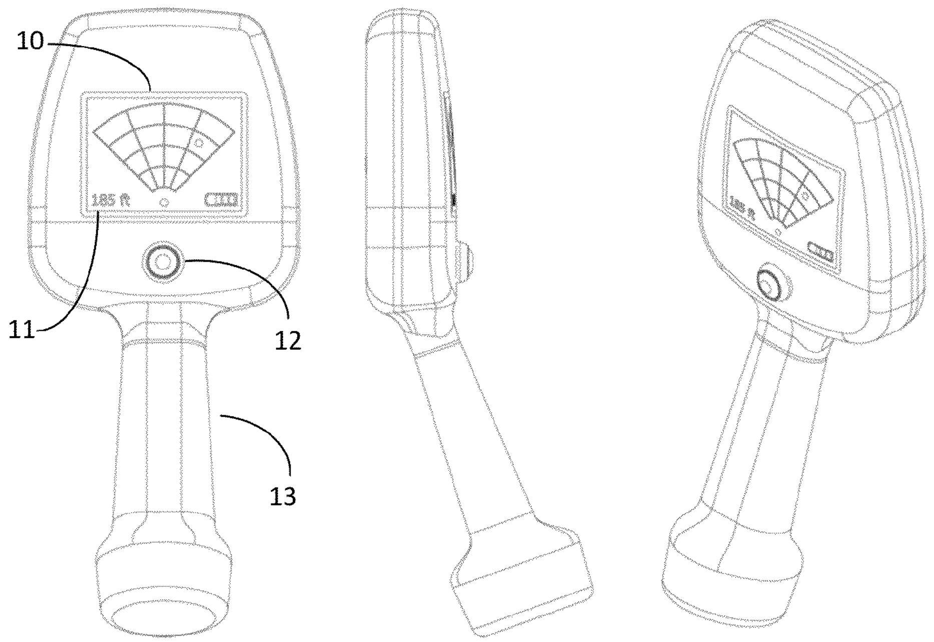
FIG. 29 shows a package for one embodiment of the invention.

Several techniques can be used to determine the AOA from the TDOA values. For example, if ($T_3$-$T_1$) is 0, FIG. 29 shows that two possible angles are possible: 30° and 210°. This ambiguity is resolved by noting that ($T_2$-$T_1$) will be either −129 μs at 30° and +129 μs at 210°. A second technique—essentially the mirror of the first—would use the ($T_2$-$T_1$) value (which will also produce two possible solutions) and pick the correct one based on the value of ($T_3$-$T_1$).

Figure 26:
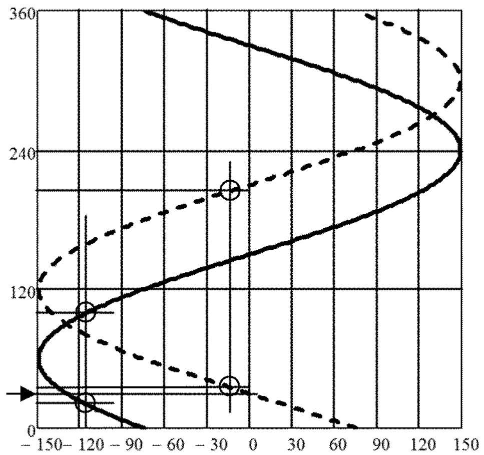
FIG. 26 shows an improved method to determine TDOA using Sensors 2 and 3.

However, since the TDOA values will be affected by noise, a third approach—one that produces more-accurate results—is to use both TDOA values to estimate the AOA that minimizes the mean square error. The embodiment of this third approach will pick which of the four possible solutions produces the smallest error. The technique is illustrated in FIG. 26. Assume, for example, that the true angle-of-arrival is 30° (indicated in FIG. 26 with an arrow); ideally, the TDOA for Sensor 2 would be −129.4 μs and the TDOA for Sensor 3 would be 0 μs using the TOA of Sensor 1 as the reference. However, assume that noise has caused the measurement of TDOA-2 to be −115 μs and TDOA-3 to be −15 μs; i.e., noise causes both measurements to be reduced by about 15 μs. The two possible values for θ using TDOA-2 (solid curve) would be 20.1° and 99.9°. The two possible values for θ using TDOA-3 (dashed curve) would be 35.7° and 204.3°. The four possible solutions are listed in FIG. 26A. The value for $\theta_{Est}$ (the angle which produces the minimum mean square error) is simply the average of the individual angles derived from the TDOA. This angle also produces the minimum RMS error. The column for Solution 1 has the smallest RMS error and is thus the correct solution; the error for this example would be 2.1°.

DLPM: Discrete Linear Period Modulation

One of the advantages of LPM over LFM relates to the circuitry required to generate the chirp signal, particularly at the accuracy level required for reliable detection by a cross-correlation detector. Crystal-controlled digital techniques are preferred to assure sufficient accuracy in the signal.

For the actual generation of the PASS alarm sound, a switched power transistor and a transformer are typically used to drive the piezoelectric transducer. The drive signal to the transistor is typically a square wave at the fundamental frequency of the acoustic output signal; the transformer and piezo resonance combine to produce an acoustic output with relatively low harmonics. Since the desired drive signal to the transistor is simply a square wave, one of the simpler digital approaches is to determine the appropriate time to turn the transistor on and off using a counter driven by a higher-frequency crystal oscillator. The digital circuit determines the switching time based on the half-period of the signal. It is a relatively simple matter to change the count threshold at which to switch the transistor on and off. Simple microcontrollers, such as the Microchip PIC12F629 manufactured by Microchip Technology, Inc., of Chandler, Ariz., can easily generate such chirps; this device costs approximately $1 in 1000 quantity. Thus period modulation is a relatively simple process. Linear period modulation would be accomplished by changing the count threshold at regular time intervals.

A further embodiment uses a variation of linear period modulation and changes the count threshold for the period generator not at regular time intervals but rather at the completion of each cycle of the waveform. This approach, which is coined "discrete" linear period modulation, or DLPM, is even easier to implement in a simple microcontroller.

In contrast to period modulation, frequency modulation with crystal-controlled accuracy is significantly more difficult to generate. One approach is to use a Direct-Digital-Synthesizer (DDS) chip which generates a digital output signal using a look-up table; the digital output is then converted to an analog sine wave using a D/A converter. For example, the Analog Devices AD5930, which operates at 50 MHz, draws 8 mA, and costs about $5 in 1000 quantity, could be used to implement frequency modulation. The DDS chip must be further controlled by another processor which generates a digital control signal corresponding to the desired frequency. Compared to the simplicity of the period-modulation approaches discussed above, generating a smooth chirp for LFM involves a rather complex and potentially costly process. A second approach to generate a frequency-modulation chirp would be to use a math processor to calculate the instantaneous period and to use its output to control a period-modulation generator. For fixed chirps, the calculations could be done in advance, with period values stored in a look-up table for the period-modulation generator. This process would become cumbersome with long chirps due to the number of values that would need to be stored. For example, a 2 KHz to 4 KHz DLPM chirp would require 626 different values, one for each cycle of the chirp waveform. Thus frequency modulation could be employed for the chirp, but would not be the preferred implementation, particularly for those situations with the potential for Doppler shift due to relative motion between the acoustic source and the acoustic receiver.

Multi-Chirp Operation

The discussions above have focused on the use of a cross-correlation detector with a single chirp signal. In reality, PASS devices generate an alarm that typically repeats every 3-5 seconds. In addition, the alarm sound may consist of multiple chirps. For example, the 2013 edition of NFPA 1982 will specify an alarm signal consisting of the following sequence:

1. A single down-chirp from 4 KHz to 2 KHz with a duration of approximately 235 ms.
2. A silent interval of approximately 400 ms.
3. Four consecutive up-chirps from 2 KHz to 4 KHz, each with a duration of approximately 235 ms.
4. A silent interval of approximately 250 ms.
5. Eight consecutive up-chirps from 2 KHz to 4 KHz, each with a duration of approximately 118 ms.
6. A silent interval of approximately 1.5 sec.
7. After completion of step 6, the sequence will immediately repeat with step 1.

If the timing of the repetition rate is accurately controlled in addition to the chirp signal itself, then additional improvements to the system can be realized. For example, the correlation detection could be applied only to the single down-chirp which starts the above sequence with the remaining up-chirps being ignored. Alternatively, additional chirps, or even the entire sequence could be used by the correlation detector for improved performance in high-noise conditions at the expense of somewhat higher sidelobes; this combination would be preferred more for detecting the alarm signal compared to locating the source. If the background noise level is unusually high, the correlation detector may either indicate the detection of a non-existent chirp or may miss the detection of an existent chirp; in either situation, the noise would be causing a false indication of an alarmed PASS device. However, in a further improved embodiment, the system can monitor the past history of the correlation detector with signal-processing elements such as phase-lock loops and/or Kalman filters; the likelihood of both false positives and false negatives could be significantly reduced and the effective SNR further improved.

Figure 27:
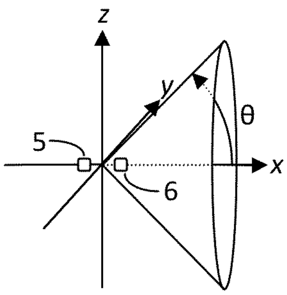
FIG. 27 shows AOA measurement with a two-microphone PASS-Tracker.

Several different types of PASS-Trackers could be developed for determining and displaying the angle of arrival of the incident acoustic wave utilizing cross-correlation detectors to determine the time of arrival at multiple microphones. Perhaps the simplest embodiment would use only two sensors/microphones and two cross-correlation detectors. FIG. 27 illustrates this embodiment with two microphones 5, and 6, located along the x axis at y=0 and z=0 and symmetric to the y-z plane. The wave's angle of arrival θ relative to the x-axis would be derived from the difference in time of arrival at the two microphones. Since only two microphones are used, no information could be derived regarding the y or z location of the source; consequently the location of the source would be on an approximately-conical surface whose cone-axis is the x-axis. In reality, the surface is a circular hyperboloid of two sheets formed by rotating a hyperbola about its semi-major axis; however, the surface can be represented by a cone for large distances compared to the sensor-to-sensor spacing. In order to determine the location of the source in the y direction, the user would need to make a second measurement by rotating the PASS-Tracker so that the microphones were oriented along the y-axis. The second measurement would be sufficient to further locate the source in the x-y plane. If the source were not in the x-y plane (i.e., not at z=0), the user would need to make a third measurement by rotating the Tracker so that the microphones were oriented along the z-axis. Since many firefighting localization exercises involve finding a person on a particular floor in a building, the third (z-axis) measurement would generally not be necessary.

In another embodiment of the concept, three microphones would be used as originally suggested in FIG. 1. If the three sensors were located in a horizontal (x-y) plane, the time difference of arrival between the microphones would determine the direction of the PASS device within a single ambiguity: if the location was not in the plane of the three sensors, the location could be either at a unique point above the plane or alternatively at the mirror-image point below the plane. For situations in which the PASS might be located either above or below the plane of the three sensors, a second measurement with the plane of the three sensors in a vertical orientation would resolve the ambiguity in z.

Figure 28:
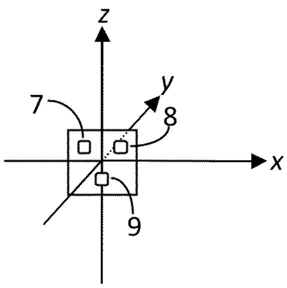
FIG. 28 shows a three-microphone system oriented differently from that of FIG. 1.

The Tracker embodiment with three sensors could also be used in an alternate configuration with the plane of the sensors oriented in a vertical direction in the x-z plane, as suggested by FIG. 28. In this orientation, the sensors (7, 8, and 9) are in the x-z plane and the PASS is assumed to be located generally in the +y direction. The TDOA approach would be able to determine the AOA of the PASS within one ambiguity: the source could also be located at a mirror position in the −y direction. A second measurement made by orienting the array of sensors either in the x-y plane or the y-z plane would resolve the ambiguity.

Another embodiment with four sensors—each located at the four corners of a tetrahedron—would be capable of determining the AOA of the acoustic wave in all three dimensions. Four sensors would be the minimum number required to uniquely determine the angle of arrival for the wave for any 3-D location. Additional sensors could also be added to this embodiment as well as any of the previous embodiments simply to provide more data for increased measurement accuracy and improved SNR.

Accelerometers, rate gyroscopes, and/or earth-magnetic-field sensors could be added to the embodiments described above to enhance the operation by sensing the orientation and rotation of the PASS-Tracker. Since the acoustic chirps from the PASS device would be intermittent—typically occurring once every 3-5 seconds—the addition of the orientation/rotation sensors would allow the display of the direction of the source to compensate for the motion of the Tracker. Thus the Tracker could be pointed in a new direction but the Tracker display of the PASS device would continue to point in the original direction. Such enhancement would allow the user to "line up" the Tracker directly toward the PASS device even though the original measurement was made with the Tracker pointing in a different direction. Such a mode of operation would be particularly useful if the PASS-Tracker were combined with a thermal imaging camera: the displayed image of the environment could be lined up with the direction to the PASS device to assist a rescue team in finding the distressed firefighter; i.e., the rescue team could "see" in which direction they should move in order to rescue the distressed firefighter. For subsequent acoustic chirps from the PASS device, the PASS-Tracker would continue to indicate the desired direction.

Radio-frequency (RF) communications could be added to all of the above embodiments to provide information to estimate the acoustic distance from the PASS-Tracker to the PASS device. If the PASS device transmits a timing pulse via an RF link simultaneously with the transmission of the acoustic chirp, the PASS-Tracker can measure the time difference between the arrival of the RF pulse and the arrival of the acoustic chirp and can estimate the distance along the acoustic path between the PASS device and the PASS-Tracker based on the difference in propagation velocities between the two signals. This technique would be an electronic equivalent of the technique of estimating the distance to a lightning flash based on five seconds per mile using the time delay from the flash to the sound of thunder. Since propagation of an RF pulse is virtually instantaneous compared to the much slower acoustic propagation, small variations in RF propagation due to a building's construction material would have negligible effect on the estimate of acoustic distance. A PASS-Tracker equipped with the RF link could display the distance in either analog or digital form—e.g., by an LED bar graph or by a numeric readout—to indicate an approximate distance along the acoustic path that the rescuer must travel to reach the PASS device of the distressed firefighter. Since some commercial PASS devices include RF telemetry, the addition of an RF timing pulse would be a relatively straightforward design effort. Adding an RF receiver in the PASS-Tracker would still be required in order to implement this distance-measurement capability.

Another embodiment of the techniques described above would focus only on the detection of the PASS alarm chirp without consideration of the time of arrival of the acoustic wave. Such an embodiment could be implemented using only a single microphone and a single cross-correlation detector. This embodiment could be deployed at a fire scene by positioning it at a building exit to assist firefighters in recognizing that a firefighter's PASS device was in alarm mode. By adding a separate RF telemetry link, the device could notify Incident Command or a rapid intervention team (RIT) that a PASS device was being detected at a particular exit of the building. Multiple units at different exits could assist Incident Command or the RIT in determining the best location to initiate a rescue. If the PASS device were to additionally implement the RF link with a timing pulse, as described previously, this embodiment of the PASS-Tracker could estimate the distance to the PASS device. By deploying multiple units with the distance-measuring capability at different exits, the exit with the shortest distance to the downed firefighter could be determined to augment the rescue process. These single-channel PASS-Trackers could also be deployed at locations other than exits—e.g., in stairwells, at rope bags, at spare air cylinders, on specific command firefighters, etc.—to further recognize that another firefighter's PASS device was in alarm mode and to assist in rescue.

Another embodiment of the techniques described above could use two microphones and one cross-correlation detectors for deployment in stairwells. If the two microphones were positioned vertically, i.e. with one microphone above the second, the PASS-Tracker could determine whether the rescue team should go up or down the stairs to reach the victim. Such an orientation could be assured simply by hanging the device in the stairwell. The device could indicate the direction by up or down LEDs or arrows. By adding an RF telemetry link, the device could notify Incident Command that it was detecting an alarmed PASS device and whether the unit was above or below the PASS-Tracker. By adding the RF timing pulse capability described above, the PASS-Tracker could also estimate and indicate the approximate distance to the PASS device.

FIG. 29 shows a possible package for a three-microphone embodiment of the invention. A graphic display 10 would indicate the direction of the acoustic source. If the RF distance-measurement feature were employed, the distance to the source along the acoustic path would be indicated numerically 11. A push-button switch 12 would control the power and operating modes of the unit. The batteries could be housed in the handle 13 of the unit. The three microphones would be located on the back of the unit directly opposite the display 10.

The PASS-Tracker could also be integrated into the firefighter Self Contained Breathing Apparatus (SCBA), particularly the mask worn by the firefighter. A simple heads-up display could indicate to the rescue firefighter the direction of the distressed firefighter, allowing hands-free operation.

Embodiments with Multiple Technologies

Different embodiments of the invention could be integrated with other types of rescue equipment used by the fire service. In one embodiment, the PASS-Tracker would be combined with the ultrasonic Pathfinder system more fully described by U.S. Pat. No. 6,504,794, entitled "Tracking, safety and navigation system for firefighters" and which issued Jan. 7, 2003, and U.S. Pat. No. 6,826,117, with the same title which issued Nov. 30, 2004. The combination of the two systems would further enhance the rescue effort by realizing the advantages of each. For example, the limited range of the Pathfinder system (120-150 feet) would be aided by the much longer range of the PASS-Tracker as suggested by FIG. 18). On the other hand, the Pathfinder system has rapid response with manual scanning of the area due to its faster data update rate; this capability would enhance the performance of the PASS-Tracker.

In a further embodiment, the PASS-Tracker could be integrated into thermal imaging cameras (TICs). The TIC has the capability to "see" through the dense smoke at a fire. If the direction of the distressed firefighter is indicated on the TIC display, the user would be directed along the path to the firefighter. The combination of the two technologies could reduce rescue time dramatically by ensuring that the rescuer does not waste precious time searching in the wrong location or heading in the wrong direction.

In a further embodiment, the PASS-Tracker could be integrated into other location technologies, such as RF and inertial. For example, US Patent Application 20110029241 entitled "Personal Navigation System and Associated Methods" by Miller, et al.; US Patent Application 20100007485 entitled "Devices, Systems and Method of Determining the Location of Mobile Personnel" by Kodrin, et al., and US Patent Application 20070229356 entitled "Devices, systems and method of determining the location of mobile personnel" by Kodrin et al., describe inertial-based and RF-based locator systems designed to track the position of firefighters at a fire scene. As another example, the Geospatial Location Accountability and Navigation System for Emergency Responders (GLANSER) program initiated by the Department of Homeland Security Science and Technology Directorate has funded several grants to develop a system to track first responders at a fire scene. While the purpose of these systems and technologies is to keep track of the current location of individual firefighters, they are incapable of determining the shortest path to the victim: without an accurate map of the building, they can only provide information on the victim's coordinates and are thus incapable of determining what path the rescuer should take to reach the victim. The combination of the two technologies—PASS-Tracker and the RF/inertial system—would facilitate the rescue effort and reduce rescue time.

Legacy PASS Devices

A further embodiment of the invention would use cross-correlation techniques to detect the time-of-arrival (TOA) of Alarm signals from legacy PASS devices (those certified to the 2007 and earlier editions of NFPA 1982). TOA measurements with three sensors/microphones would then be used to determine the angle-of-arrival (AOA) of the first PASS signal (to mitigate the effects of multipath). Initial tests with PASS devices from six different manufacturers suggest that at least three of the PASS alarms could be detected with "reasonable" performance. Measurements indicate that the performance would be inferior to use with the PASS devices certified to the 2013 Edition of NFPA 1982—typically requiring 10 to 20 dB higher SNR for the same level of performance. Nevertheless such an embodiment may still prove valuable in some rescue situations, particularly if the noise level is not excessive. To implement this embodiment, the reference waveform for the correlation detector would need to match the alarm sound for the PASS device of the particular manufacturer. This embodiment would allow fire departments that had not yet upgraded their PASS devices to the 2012 Edition of NFPA 1982 to benefit from the invention.

Correlation Detector Implementations

Figure 30:
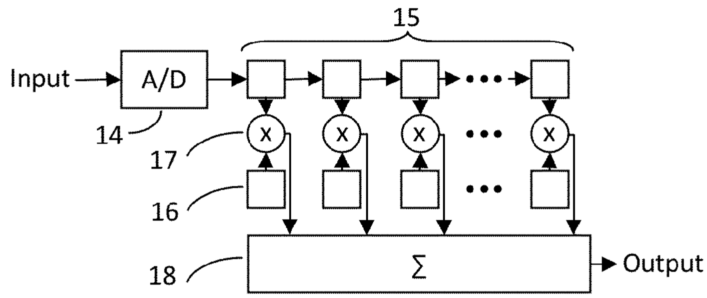
FIG. 30 shows a simplified schematic for implementing the cross-correlation detector.

Two well-known techniques can be used to implement the cross-correlation detector. The first is a time-based technique whereby the sampled waveform of the received signal is multiplied by the reference signal as illustrated in FIG. 30. The received signal is first digitized by A/D converter 14; the digitized value is applied to the input of shift register 15, which shifts each value one level to the right after every conversion. The stages of shift register 15 thus contain consecutive samples of the received signal. The conversion rate for A/D 14 is determined based on the desired time resolution for the cross-correlation. The length of shift register 15 is then determined by the length of the reference signal divided by the desired time resolution. Register 16 stores the values of the reference signal with the same time resolution. Each of the values in shift register 15 is multiplied by the corresponding value in the reference register 16 by multipliers 17. The outputs of the multipliers 17 are added in accumulator 18; the sum of the products is the output of the cross-correlator. As the input signal to A/D 14 is digitized, the reference signal "slides" along the input signal due to the action of shift register 15. Since the reference signal is known for PASS devices certified to the 2013 Edition of NFPA 1982, the values stored in register 16 would be predetermined.

The shift-multiply-add process illustrated in FIG. 30 is particularly well suited for implementation with DSPs (Digital Signal Processors) such as the dsPIC30F manufactured by Microchip Technology, Inc., of Chandler, Ariz.; the C2000 series devices manufactured by Texas Instruments of Dallas, Tex.; the STM32-F4 series devices manufactured by ST Microelectronics of Coppell, Tex.; and the RX62N series devices manufactured by Renesas Electronics, Inc., of Santa Clara, Calif.

Figure 31:
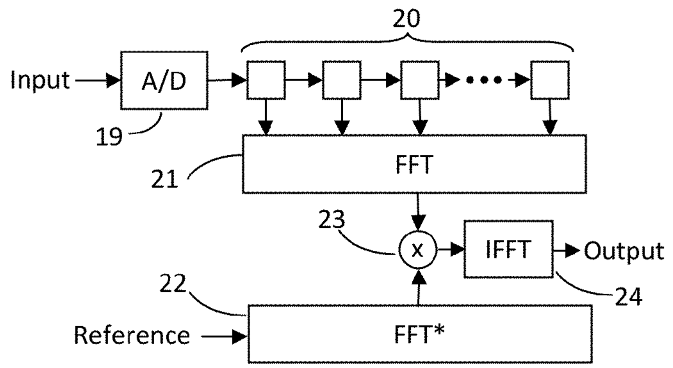
FIG. 31 shows an alternate schematic for implementing the cross-correlation detector based on the use of Fourier Transforms.

An alternative technique to implement the cross-correlation detector involves the use of Fourier transforms, as illustrated in FIG. 31. The received signal is digitized by A/D converter 19 and consecutive samples are stored in register 20 in much the same manner as for the implementation of FIG. 30. Register 20 could be a shift register as before, or it could simply be a register in a DSP device addressed by a pointer that moves to consecutive locations in memory. The digitized samples stored in register 20 are processed by a complex FFT (Fast Fourier Transform) algorithm in the DSP device at 21. The reference signal is also processed by the DSP with a similar FFT algorithm at 22, the only difference being that the FFT is conjugated after the transform (i.e., the imaginary part is negated). The two transforms are then multiplied by complex multiplier 23. The complex product is then converted from the complex frequency domain back to the time domain by an Inverse FFT algorithm at 24; the result of the inverse transform is the cross-correlation of the input and reference signals. One advantage of the implementation of FIG. 31 over that of FIG. 30 is that the FFT and conjugation of the reference signal can be done in advance and stored in the DSP memory. Thus only the single FFT 21, the multiplication 23, and the inverse FFT 24 would need to be done repeatedly in real time. Because of the efficiencies of the Fast Fourier Transform method, the algorithm of FIG. 31 is preferred over that of FIG. 30 in situations where the number of samples of the two signals is large since it can be done in a shorter period of time. The algorithm depicted in FIG. 31 is also well suited to being implemented in the DSP devices previously listed.

What is claimed is:

1. An apparatus for detecting a presence of a sound of an acoustic device, the apparatus comprising:

a. at least one sensor, capable of receiving the sound of the acoustic device and converting the sound to an electrical signal;

b. a signal processor capable of identifying the particular sound pattern of the acoustic device; and c. an indicium of the detection of the acoustic device;

wherein the signal processor performs the mathematical function of cross-correlation between two inputs, the first input being the electrical signal from the sensor, and the second input being a pre-determined reference pattern of the particular sound pattern of the acoustic device; and wherein the sound pattern of the acoustic device is based on a swept-frequency technique selected from the group consisting of: a linear frequency modulation chirp, a non-linear frequency modulation chirp, a linear period modulation chirp, a discrete linear period modulation chirp, and a nonlinear period modulation chirp.

2. The apparatus of claim 1 wherein the indicium of the detection of the acoustic device is selected from the group consisting of: a visual indication and an audio indication.

3. The apparatus of claim 1 wherein the apparatus for detecting the sound of an acoustic device further comprises:

a device, wherein the device is disposed to transmit the indication of the detection of the acoustic device to a remote location.

4. The apparatus of claim 1 wherein:

a. the acoustic device is disposed to generate a radio-frequency-based signal indicating the time of the transmission of the acoustic sound;

b. the apparatus further comprises a Radio Frequency receiver to determine the time of the transmission of the acoustic sound;

c. the signal processor is capable of measuring the time difference between the receipt of the RF signal and the receipt of the sound of the acoustic device;

d. the signal processor is capable of determining the distance along the path to the acoustic device based on the said time difference; and e. the apparatus further comprises an indicator disposed to display the distance along the path to the acoustic device.

5. A method for detecting the presence of the sound of an acoustic device, utilizing the apparatus of claim 1, comprising the steps of:

a. Receiving the sound of the acoustic device by means of at least one sensor; and b. converting the sound to an electrical signal;

c. Identifying the particular sound pattern of the acoustic device by means of a signal processor; and d. Indicating the detection of the acoustic device by means of an indicium.

6. An apparatus for detecting the presence of a sound of an acoustic device, and indicating the direction of the path to the acoustic device in a difficult-to-hear environment, the apparatus comprising:

a. at least two sensors, capable of receiving the sound of the acoustic device and capable of converting the sound to a plurality of electrical signals;

b. at least one signal processor capable of identifying the particular sound pattern of the acoustic device;

c. an indicium of the detection of the acoustic device;

d. Additional signal processing capable of determining the direction of the path to the acoustic device; and e. Indicia of the direction of the path to the acoustic device;

wherein the signal processor performs the mathematical function of cross-correlation between two inputs, the first input being the electrical signal from the sensor, and the second input being a pre-determined reference pattern of the particular sound pattern of the acoustic device; and wherein the sound pattern of the acoustic device is based on a swept-frequency technique selected from the group consisting of: a linear frequency modulation chirp, a non-linear frequency modulation chirp, a linear period modulation chirp, a discrete linear period modulation chirp, and a nonlinear period modulation chirp.

7. The apparatus of claim 6 wherein a. the signal processor further performs the mathematical function of cross-correlation between additional pairs of inputs, the first input being the electrical signal from additional sensors, and the second input being the pre-determined reference pattern of the particular sound pattern of the acoustic device;

b. the signal processor further determines the time-of-arrival at each of the sensors of the sound from the acoustic device based on the cross-correlation function;

c. the signal processor further determines the angle-of-arrival relative to the apparatus of the sound based on the difference in times-of-arrival at the sensors of the sound from the acoustic device; and d. the signal processor further determines the direction to the acoustic device based on the angle-of-arrival relative to the apparatus of the sound from the acoustic device.

8. The apparatus of claim 7 wherein the times-of-arrival at the sensors of the sound from the acoustic device is based on the peaks of the cross-correlation functions.

9. The apparatus of claim 7 wherein the times-of-arrival at the sensors of the sound from the acoustic device is based on the relative phase of the cross-correlation functions.

10. The apparatus of claim 6 wherein the indicium of the detection of the acoustic device is selected from the group consisting of: a visual indication and an audio indication.

11. The apparatus of claim 6 wherein the indicia of the direction of the path to the acoustic device is a plurality of visual indicators.

12. The apparatus of claim 6 wherein the indicia of the direction of the path to the acoustic device is a graphical display.

13. The apparatus of claim 6 wherein the apparatus further comprises a device, capable of transmitting the indication of the detection and the direction of the acoustic device to a remote location.

14. The apparatus of claim 6, wherein the apparatus further comprises includes one or more orientation sensors, to measure the change in orientation of the apparatus; and wherein the signal processor compensates for the change in orientation of the apparatus to thereby maintain the indication of a constant direction in inertial space of the path to the acoustic device.

15. The apparatus of claim 6 wherein a. The acoustic device further generates a radio-frequency-based signal indicating the time of the transmission of the acoustic sound;

b. The apparatus further includes an RF receiver to determine the time of the transmission of the acoustic sound;

c. The signal processor is further capable of measuring the time difference between the receipt of the RF signal and the receipt of the sound of the acoustic device;

d. The signal processor is further capable of determining the distance along the path to the acoustic device based on the said time difference; and e. The apparatus further includes an indicator to display the distance along the path to the acoustic device.

16. The apparatus of claim 6 wherein the apparatus for detecting the presence of the sound of an acoustic device and indicating the direction of the path to the acoustic device is combined with other firefighting rescue tools.

17. The apparatus of claim 16 wherein the rescue tool is selected from the group consisting of: a thermal imaging camera and a personnel location device.

18. A method for detecting the presence of the sound of an acoustic device, utilizing the apparatus of claim 6, comprising the steps of:

a. Receiving the sound of the acoustic device by means of at least two sensors;

b. converting the sound to electrical signals;

c. Identifying the presence of the particular sound pattern of the acoustic device by means of at least one signal processor;

d. Indicating the detection of the acoustic device by means of an indicium;

e. Determining the direction of the acoustic device by means of additional signal processing; and f. Indicating the direction of the path to the acoustic device by means of indicia.

* * * * *